*INVENTORS*
WILLIAM E. VAN HORNE
GLENROY W. BARNETT
BY Philip M. Dunson
ATTORNEY INVENTORS
WILLIAM E. VAN HORNE
GLENROY W. BARNETT
BY Philip M. Dunson
ATTORNEY July 20, 1965 W. E. VAN HORNE ETAL 3,196,447

PRODUCTION RECORDING SYSTEM

Filed Nov. 13, 1961 15 Sheets-Sheet 3

INVENTORS
WILLIAM E. VAN HORNE
GLENROY W. BARNETT

BY Philip M. Dunson

ATTORNEY

*INVENTORS*
WILLIAM E. VAN HORNE
GLENROY W. BARNETT
BY Philip M. Dunson
ATTORNEY INVENTORS
WILLIAM E. VAN HORNE
GLENROY W. BARNETT
BY Philip M. Dunson
ATTORNEY

*INVENTORS.*
WILLIAM E. VAN HORNE
GLENROY W. BARNETT

*BY*

Philip M. Dunson

ATTORNEY

INVENTORS
WILLIAM E. VAN HORNE
GLENROY W. BARNETT
BY Philip M. Dunson
ATTORNEY

INVENTORS
WILLIAM E. VAN HORNE
GLENROY W. BARNETT
BY Philip M. Dunson
ATTORNEY

INVENTORS
WILLIAM E. VAN HORNE
GLENROY W. BARNETT
BY Philip M. Dunson
ATTORNEY

INVENTORS
WILLIAM E. VAN HORNE
GLENROY W. BARNETT
BY Philip M. Dunson
ATTORNEY

*INVENTORS*
WILLIAM E. VAN HORNE
GLENROY W. BARNETT
BY Philip M. Dunson
ATTORNEY INVENTORS
WILLIAM E. VAN HORNE
BY GLENROY W. BARNETT
Philip M. Dunson
ATTORNEY July 20, 1965 W. E. VAN HORNE ETAL 3,196,447

PRODUCTION RECORDING SYSTEM

Filed Nov. 13, 1961 15 Sheets-Sheet 13

*INVENTORS*
WILLIAM E. VAN HORNE
*BY* GLENROY W. BARNETT
Philip M. Dunson
ATTORNEY

NOTE:

(a) EACH OPERATOR'S STATION IS SIMILAR TO ONE SHOWN INSIDE DASHED LINES.

(b) ALL OPERATORS' STATIONS CONNECT IN PARALLEL AT POINTS A, B, C, D, E, AND F.

*INVENTORS*
WILLIAM E. VAN HORNE
BY GLENROY W. BARNETT
Philip M. Dunson
ATTORNEY INVENTORS
WILLIAM E. VAN HORNE
BY GLENROY W. BARNETT
Philip M. Dunson
ATTORNEY United States Patent Office 3,196,447
Patented July 20, 1965

3,196,447
PRODUCTION RECORDING SYSTEM

William E. Van Horne and Glenroy W. Barnett, Columbus, Ohio, assignors to Keinath Instrument Company, Columbus, Ohio, a corporation of Ohio
Filed Nov. 13, 1961, Ser. No. 152,958
26 Claims. (Cl. 346—17)

This invention relates to a production recording system. It has to do particularly with apparatus for logging production data in both digital and graphic form. A typical production recording system according to the present invention includes charts showing minute-by-minute throughout the day the total amount produced by each of any number of machines, and the rate at which each machine has produced at all periods throughout the day in relation to what is normal for that machine. It also shows in a unique way the amount of time each machine has been down, and the reason why. A graphic record is provided showing the amount of downtime for each machine and when it occurred. The reason for each period of downtime is recorded and displayed for each machine; and the total number of machine minutes lost for each of a number of categories of causes is shown on separate digital counters.

In some of its aspects this invention is related to our copending United States patent applications, Serial No. 115,182, filed June 6, 1961, Serial No. 124,592, filed July 17, 1961, now Patent No. 3,090,001, and Serial No. 140,049, filed September 22, 1961, now Patent No. 3,149,900.

In the past, a great deal of effort has been routinely put forth to obtain detailed production data. Many machines have been equipped with digital counters, and production clerks have kept detailed log-sheets showing the numbers of items produced, hour-by-hour. In addition, many types of automatic data accumulation systems have been developed, some capable of accumulating and logging enormous quantities of figures and data.

Unfortunately, many attempts at centralized production data accumulation have foundered because insufficient attention was devoted to the methods by which information was recorded and presented. Overlooked was the fact that the production supervisor or plant manager is a human being who can assimilate only so much data. It does no good to record great quantities of information unless it is in such a form that the man who must use it can easily interpret it. Long columns of figures are not easily interpreted, however recorded.

The need for an improved method of recording and displaying production information led to the present invention, a system that displays current information in both digital and graphic form. The following information can be displayed: A. The total number of pieces (or pounds, feet, gallons, etc.) produced by each of a number of machines, measured from the beginning of a shift or day. B. The rate at which each machine is producing, minute-by-minute, in relation to what is normal for that machine or process. C. The trend of the production rate: whether production is speeding up or slowing down. D. If machine downtime has occurred, precisely when, and for how long, each machine was down. E. The reason for the downtime. F. An over-all summary of the total number of machine-minutes of downtime for each of several causes.

A typical graphic recorder as employed in the production recording system of this invention is shown in FIG. 26. It contains a master chart printed with a number of chart-frames, or graphs, aligned in columns and rows. Each chart-frame is used to record the production of one machine or process. The chart trace is recorded on the chart-frame by means of a master print-bar which scans periodically from top to bottom across the paper. Inside the print bar are solenoid operated hammers which print dots through a typewriter ribbon. As time passes, the dots move to the right forming a continuous line in the form of the "ramp" of production.

The key to the easy readability of the charts, and a factor that makes it unique, is the ramp chart method of recording the production data. To exemplify how a ramp chart recording shows a complete picture of production, FIGS. 28 and 29 show graphs of the production from each of two machines. In both cases, the height of the graph is made equal to the total number of parts normally produced in one shift while the horizontal dimension is time, running from zero to eight hours. On each graph is recorded the total number of pieces produced since the beginning of the shift. It can be seen that if each machine is producing at exactly its normal rate the record of pieces produced follows a diagonal line starting from zero at the beginning of the shift and just reaching the upper right-hand corner of the graph at the end of the eight hours. This diagonal line, then, graphically shows the "norm." Any record above this line shows a total above normal and, conversely, a record below the line indicates below-normal production. Furthermore, if the slope of the line showing the production is steeper than the diagonal, this shows that the rate of production at that instant is greater than normal, regardless of what else may have happened during a shift.

In the example shown, it is obvious at a glance that one machine produced at above the normal rate during the entire shift, reached its eight-hour goal before the end of the shift, and (shown by the graph starting again at zero) produced additional pieces by the end of the shift. On the other hand, the second fell short of its eight-hour goal. It produced normally for the first part of the shift and then was shut down. During the last part of the shift production returned to normal, but it could not make up the total lost during downtime.

In addition to the downtime record on the ramp chart, a separate downtime graph is provided which shows not only the time and duration, but also the cause of any downtime that has occurred. As shown in the drawing, the downtime graph has six spaces, each labeled with a category of common downtime causes. Whenever the trace on the ramp chart becomes horizontal, indicating downtime, an exactly equivalent straight line is drawn on one of the spaces of the downtime graph. This not only shows a very clear graphic record of timing, duration, and cause of major downtime periods, but also calls attention to downtime periods of only a minute or two, which might not be noticed on the ramp chart.

To create the production data in electrical form, so that the logger can record it, an accumulator is put on each production machine. The accumulator is a step-actuated variable resistance which makes one complete revolution, from zero to maximum, after a number of electric pulses have been fed to it. The total number of pulses required to drive one complete revolution is made equal to the normal number of pieces produced by that machine. For counting, it is only necessary to create an electric pulse for each piece (or pound, or gallon, etc.) produced. These pulses can be made by limit switches, revolution counters, photocells, pressure switches, or any other electric actuator. Accumulators can be provided having any practical range from a few up to many millions of pieces per eight-hour shift.

The principle of operation of the recorder is the familiar Wheatstone bridge. Synchronized with the sweep of the print bar over the chart, a varible resistor is swept through its range of resistance, from zero to maximum. At the instant when the resistance of the internal resistor is exactly equal to the resistance of the similar unit on the remote accumulator, the print-hammer makes a mark on the chart. Hence, each time the print-bar sweeps across the chart it simply records the total resistance that has been accumulated on each of the accumulators up to that time. This defines the ramp chart.

In order to identify the cause of any downtime that occurs, so that it can be recorded in the proper space on the downtime graph, the operator is provided with a five-position pushbutton station. Each button is labelled with a common downtime cause. On the front panel of this unit is a red alarm light. When shutdown occurs on the machine, this alarm lights up, indicating that the operator must diagnose the problem and identify the cause by means of the appropriate button. If he does not do so, the downtime is recorded as "unclassified" on the downtime graph.

Operation of the alarm light at the operator's station is repeated at the recorder. The platen, or printing surface when backs up the chart on the recorder, is translucent. The recorder alarm light is mounted behind the platen and when the light comes on, the appropriate ramp chart lights up in red.

Through the use of accessory digital counters, a summary is made of the total downtime loss in the entire department. The counters may be built into the side of the recorder, as in FIG. 26. The top six counters give the total machine-minutes lost for each of the five classified and one unclassified causes. The remaining counters accumulate in digital form the piece count from each machine, starting from the beginning of each job-order.

The bridge circuit of the recorder makes possible certain other functions over and above the recording of the total number of pulses accumulated. Simple arithmetic operations can be performed by positioning of resistances on the various arms of the bridge. Hence, without additional computing circuits of any kind, the recorder can perform addition, subtraction, or multiplication. For example, the output of a number of machines can be recorded separately on several chart frames, then the total of the machines can be added together and recorded on another chart frame. Or, if it is desired to record good production and if separate counts of the total rejects are possible, the recorder can subtract the total rejects from the total produced to record only the total accepted.

A specific example of arithmetic computation which deserves separate mention is the calculation of tonnage of sheet or strip materials. In basic metal production, paper-making, paper converting, plastic extrusion, and elsewhere it is often desirable to know at all times the production rate in pounds per minute or tons per hour. However, the only production factor that is subject to direct measurement is the lineal footage per minute or hour. The recorder can be used to accumulate pulses representing lineal feet of strip, and multiply this factor by width and thickness, or weight per unit of area (either total weight or the weight of coating applied) to express on the ramp chart the production rate in tons rather than feet or yards.

In many job-shops, the normal production rate of each machine is not a constant. Instead it changes with each order, depending on what type of work has been assigned to each machine. In cases such as this, the graph is made to read in "Percent of Normal," from 0 to 100 percent. The absolute number of pieces represented by 100 percent is set for each order by the production control department, simply by setting a dial inside a locked cabinet. In this way a supervisor can see a meaningful record of production from a machine whether its normal rate is 10 or 10,000 pieces per shift.

A slightly different kind of production recording situation from that discussed so far, is one in which it is necessary to relate certain process variables to the production rate. The recorder can record electrical quantities and variables that can be transduced into electrical quantities. Sizes up to 100 chart frames are possible. On these recorders the temperatures, pressures, and flows are recorded alongside the production ramp chart to show cause and effect relationships. Practically any information relating to production rates can be recorded in direct relationship. In-process inventories, material flows, ampere loads, spindle speeds, hopper levels, and other significant variables can be handled to give a truly complete picture of the conditions throughout a production operation.

The production recording system of this invention utilizes the sweep-balance principle in the measuring circuit. A sweep-balance measuring circuit is a true potentiometer circuit; that is a circuit in which an unknown is compared with a known millivoltage and, at the instant the two are equal, no current flows. In this invention, the chart-printer is mechanically geared to a voltage divider on which a reference voltage is developed which is exactly proportional to the position of the printer on the recording chart. The printer is driven at constant speed, "sweeping" over all chart frames. The voltage divider makes one complete revolution for each chart frame "swept." At the instant during the sweep that a null condition exists in the potentiometer circuit, a mark is printed on the chart. This cycle is repeated continuously with the marks slowly displaced in the time direction so that a continuous line is formed.

The apparatus of this invention records on a sheet of paper which has been preprinted (to specification) with a series of chart frames. Preferably the larger charts are slit in two for convenience in handling. These sheets are mounted on a translucent platen, or printing surface, and mechanically stretched and clamped to insure dimensional stability, unaltered by humidity. Recording are made by a master print-bar which contains solenoid-actuated print-hammers and ink impregnated ribbons. The print-bar scans from top to bottom and return, printing a dot in each frame on each sweep. Preferably the normal sweep period is ten seconds down and ten seconds back, and printing may take place in both directions. The invention includes multi-color recorders where one color is printed during the downward sweep, another on the upward sweep. In single color units, printing alternates between adjacent rows upon reversal of direction. The printers are slowly displaced in the time direction so that successive dots form a continuous-line trace.

Preferably the platen is translucent, and back-lighted, so that light comes through the paper. Colored acetate symbols or color-blocks may be applied to color-code the various chart frames, or for other purposes. Annunciator alarm lights may be mounted immediately behind the appropriate chart frames so that high-intensity light spots are projected through the paper to signify alarm conditions.

This invention has a number of advantages and improvements over conventional or previously known recorders. More information is recorded in one small area, on one sheet of paper, in front of one observer. As an example, 400 variables may be recorded on 100 separate chart frames in four colors. Each chart frame may have an independent calibration. There is a common time scale between all chart frames making it easy to cross-correlate between all recorded quantities. All process records are on one or two sheets of paper so that records are more conveniently usable after the chart has been removed from the instrument as, for example, compared to strip charts. All records are in chart-trace form so that it is easy to see trends, easy to see upsets, and easy to compare adjacent rows of charts. Both electrical and pneumatic variables may be recorded on one chart. The annunciator includes alarm lights projected through the rear of the chart at the precise location where the off-normal variable is recorded so that no ambiguity is possible. The multiple recorder-annunciator provides low costs per recorded point.

Figure 1:
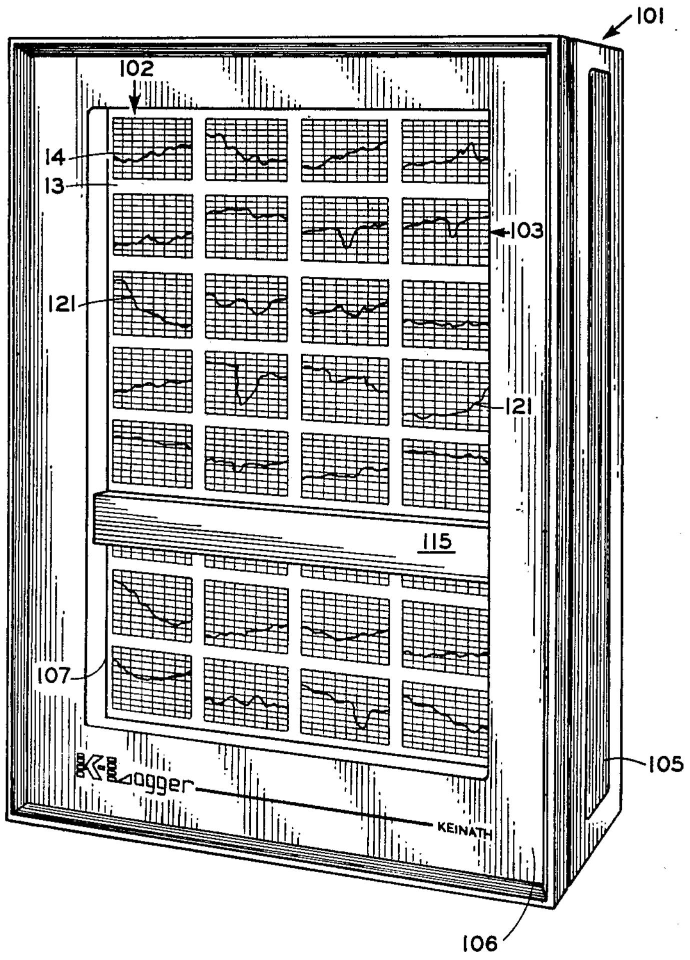
FIG. 1 is a perspective view showing the front of the recorder.
Figure 2:
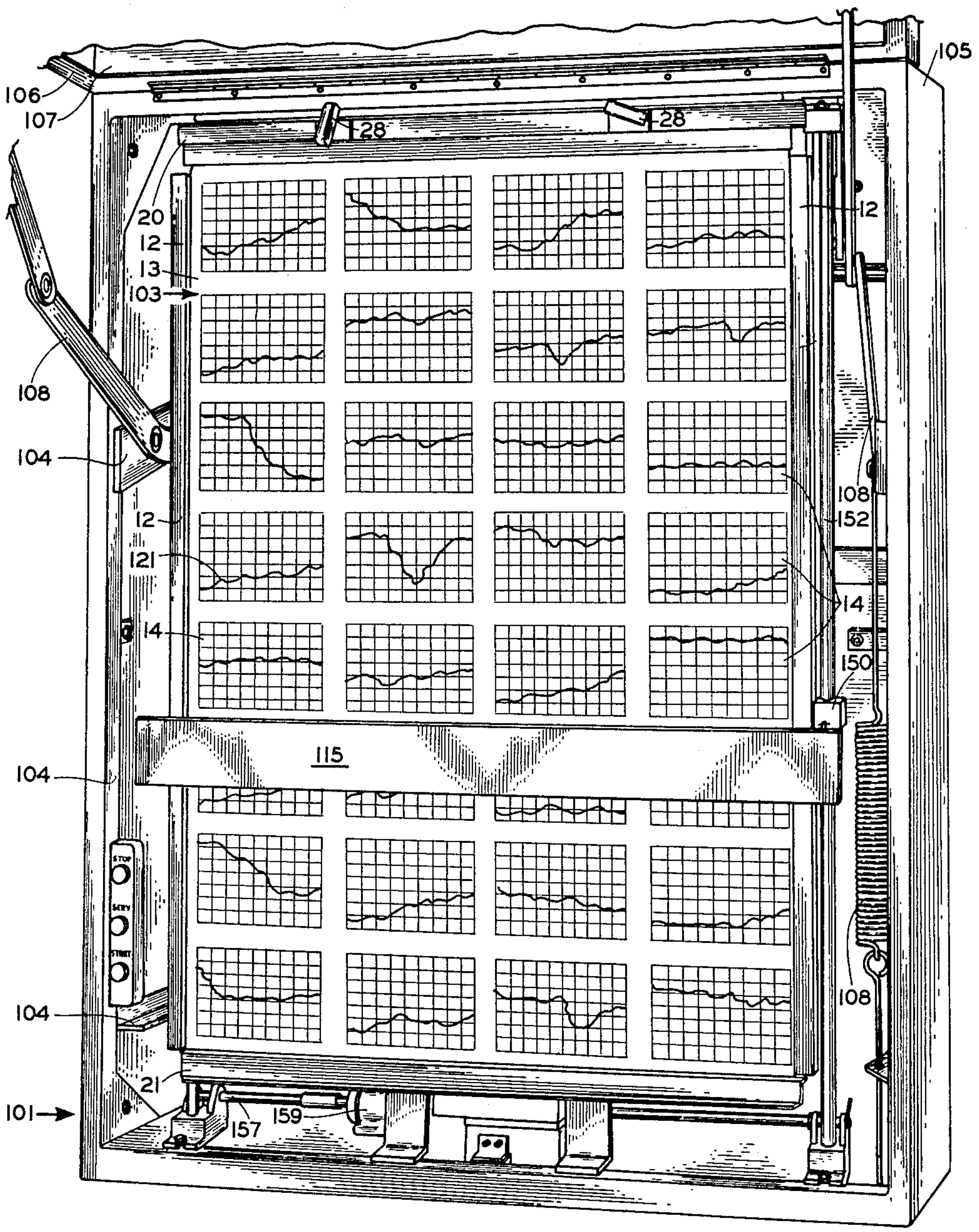
FIG. 2 is a perspective view of the recorder with the front door opened.
Figure 3:
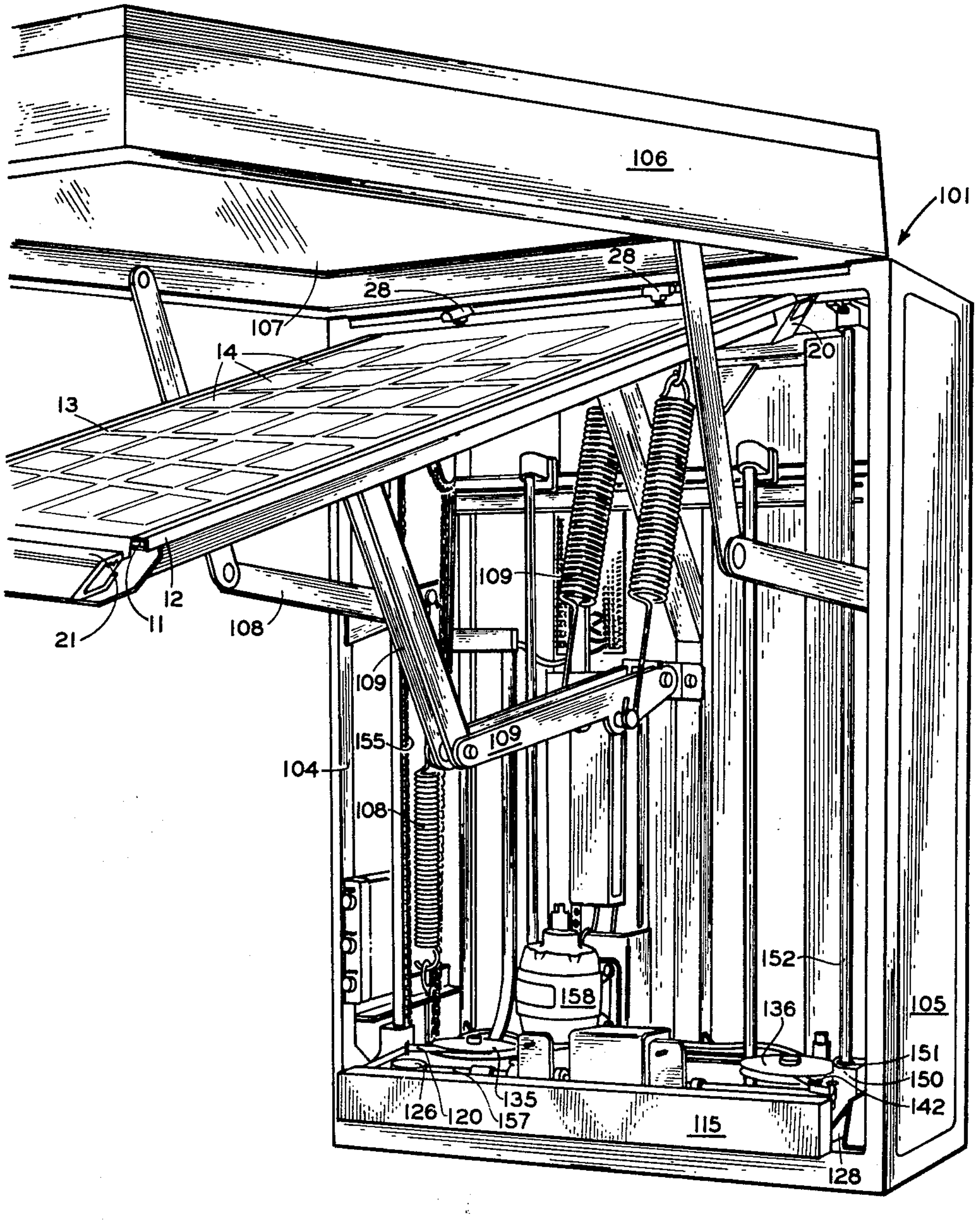
FIG. 3 is a perspective view of the recorder with both the front door and the chart platen opened.

Referring to FIGS. 1, 2, and 3, the recorder 101 is a unit which records a number of variables on a sheet of paper 13 which has been printed with a number of strip chart-frames 14—14 arranged in columns 102 and row 103. Each of the chart-frames 14—14 can be considered equivalent to a separate recording instrument and can have a calibration which is completely independent of any other. Hence, a single recorder can accept inputs from thermocouples, pressure transducers, flow transmitters, tachometers, strain-gauges, etc.

The recorder 101 is built in a frame 104. The parts of the equipment mount to this frame 104. The "skin" of the housing 105 is preferably made up of shallow pans, which bolt to the frame 104 with gasketed joints.

The front door 106 of the recorder 101 includes transparent material 107 such as Plexiglas. It is hinged at the top, and counter-balanced by spring-loaded lever operators 108—108 at both sides. The levers 108—108 are designed in such a way that they hold the door 106 closed against its gasket until the door is lifted so that the levers 108—108 pass their "dead center" position. From this point upward, they lift the door 106 and hold it open.

The paper 13 upon which the recording is made is one large sheet upon which are printed chart-frames 14. On wide recorders, the chart is preferably slit vertically down the center to make two pieces for ease in handling. Since paper is hygroscopic and tries to shrink or grow with changes in humidity, it must be stretched and clamped into place, so that the most extreme humidity changes cannot change the dimensions in the slightest in the direction of the ordinates of the graphs. To make this possible, a good grade of map paper is preferably used and the "grain" of the paper 13 is oriented horizontally in the recorder 101 so that the stretch is applied "cross-grain."

The platen 11, or printing surface against which the paper 13 is held, provides the solid backing required for recording. It is made up of a heavy transparent material preferably Plexiglas sheet mounted on a steel frame 12. At both top and bottom are paper holding and positioning mechanisms 20 and 21 which are used to clamp and stretch the chart paper 13. The whole platen 11 is hinged at the top with spring-loaded lever operators 109 similar to the operators 108 on the outer door 106; the platen 11 likewise can be lifted for access to the interior of the recorder 101.

Since the platen 11 is translucent, lights mounted inside the recorder cabinet show through both platen 11 and paper 13. At all four corners of the platen 11 are fine scribe-marks which act as guide lines 15 for positioning the recording chart. To apply a chart 13 to the recorder 101, the thumbscrews 28 and 28' at both top 20 and bottom 21 are turned until the clamp jaws 29, 29', 30 and 30' open. Then the chart paper 13 is slipped between the open jaws 29, 29', 30 and 30' at both top and bottom and roughly positioned. Starting at the top, the thumbscrews 26' are turned until the clamp 20 closes on the paper 13. Next the thumbscrews 26' at the bottom are turned until the bottom clamp 21 also closes. The light coming through the platen 11 and paper 13 from the rear show clearly on the platen 11. It is now a simple matter to bring the chart 13 into precise alignment with these marks 15 by using the thumbscrews 26 and 26' as vernier adjustments.

It will be noted that the same thumbscrews 26 and 26' in the paper holding and positioning mechanisms 20 and 21 first cause the clamp to close, then after the clamp closes tightly, stretch the paper 13. When the paper 13 is finally stretched into position, it will be noticed that the paper 13 itself is under quite high tension which holds it tightly against the flat platen 11. As the humidity changes, this tension will increase or decrease and the paper 13 will attempt to shrink or grow. However, it cannot do so since it is firmly held to the required dimension and the clamps will not let it shrink; likewise the amount of prestretch in the paper 13 is more than enough so that even under the most extreme humidity conditions, it cannot grow to such an extent that it gets "baggy."

Figure 4:
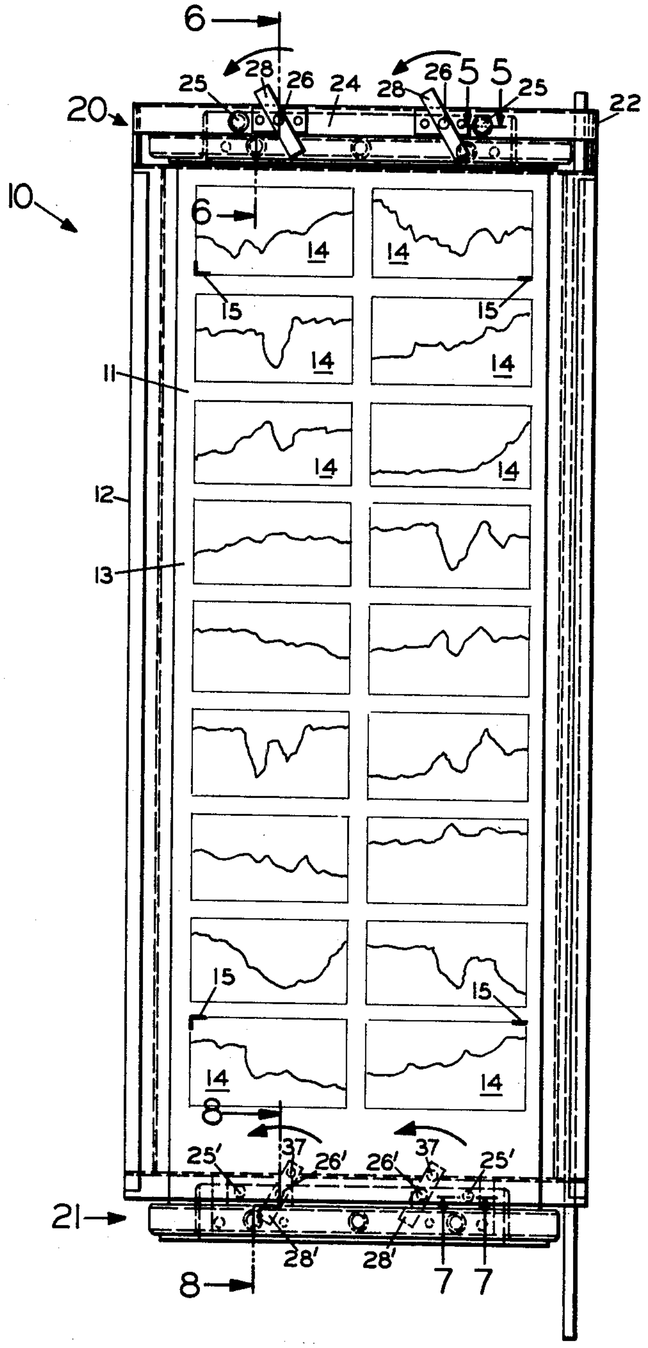
FIG. 4 is a front plan view of typical holding and positioning apparatus according to the present invention.

Referring to FIGS. 4–8, typical holding and positioning apparatus 10 according to the present invention comprises a platen 11 held by a framework 12. The platen 11 is made of transparent or translucent material such as a heavy rigid plastic sheet, and the frame 12 is made of any suitably strong material such as steel. The platen 11 provides a solid backing for a sheet of paper 13 which may have chart frames 14—14 printed or otherwise marked thereon. Typical chart frames 14 are rectangular as shown in FIG. 4 and may have therein coordinate markings such as rectangular, semilog, log-log, square root, or any other desired coordinates or markings. Scribe marks or guide lines 15—15 are provided on the platen 11. Preferably one guide line 15 is provided near each corner of the platen 11, each guide line 15 coinciding with the proper position for a similar line on the paper 13, such as a line defining a chart frame as shown in FIG. 4.

The top and bottom ends of the frame work 12 include paper holding and positioning mechanisms 20, 21, respectively. In the top mechanism 20, a stationary frame member or housing 22, which is fixedly attached to the platen 11, provides a housing and mounting for most of the other components of the top mechanism 20. A right angled support member 23, which extends substantially the width of the top mechanism 20 has rigidly affixed thereto a guide member 24 which is slidably mounted by means of holes therein on a plurality of guide pins 25, which are rigidly mounted on the housing 22. The position of the guide member 24 is controlled through threaded holes, one near each end of the guide member 24, by means of thumbscrews 26, each of which is rotatably mounted on the housing 22 through a thrust bearing 27. Each thumbscrew 26 is manually controlled by a handle 28.

Figure 6:
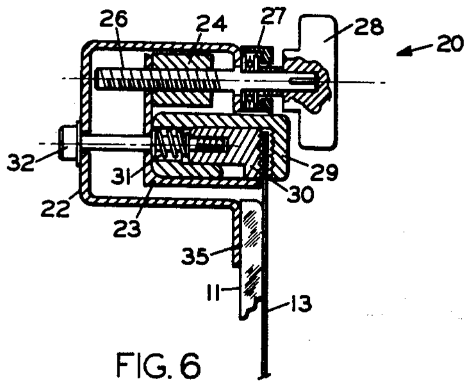
FIG. 6 is a sectional view taken on the plane 6—6 of FIG. 4.

Also fixedly attached to the angle support 23 is an outer clamp jaw 29. An inner clamp jaw 30 is slidably mounted in the outer clamp jaw 29. A strong compression spring 31 normally presses the clamp jaws 29, 30 tightly together holding the paper 13 firmly between their two clamping edges. The forwardmost position of the inner clamp jaw 30 is limited however by a shoulder screw 32 to which the inner clamp jaw 30 is fixedly threaded. In FIG. 6, the inner clamp jaw 30 is shown in its forwardmost position as limited by the shoulder screw 32, while the outer clamp jaw 29 has been moved forward by the thumbscrew 26 far enough to provide space for inserting the paper 13 between it and the inner clamp jaw 30.

After the paper has been inserted between the clamp jaws 29, 30, the handle 28 of the thumbscrew 26 is turned so as to move the outer clamp jaw 29 back against the inner clamp jaw 30. The inner clamp jaw 30 remains pressed forward by the spring 31 to its forwardmost position as shown in FIG. 6 until the outer clamp jaw 29 is firmly pressed against the paper 13 and the inner clamp jaw 30, and further turning of the handle 28 in the same direction moves everything mounted on the angle support 23, including the inner upper end of the clamp jaw 30 and the shoulder screw 32, back, pulling the paper 13 to its desired position.

Figure 7:
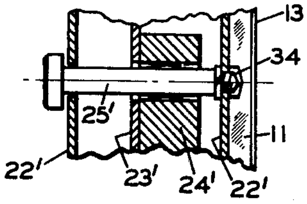
FIG. 7 is a sectional view taken on the plane 7—7 of FIG. 4.
Figure 8:
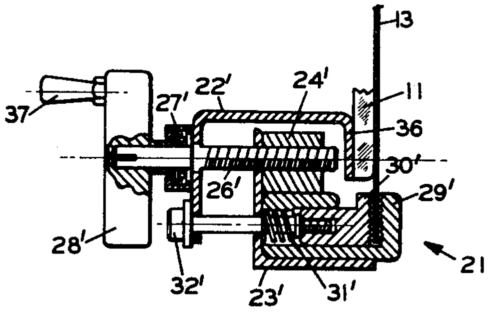
FIG. 8 is a sectional view taken on the plane 8—8 of FIG. 4.

The bottom paper holding and positioning mechanism 21 may be identical to the top mechanism 20 (turned upside down, of course), and in some equipment it would be preferred that the top and bottom mechanisms 20, 21 be identical, because of savings in the cost of manufacture. Where it is preferred that the mechanism not extend any farther beyond or in front of the platen than is necessary, however, and where it is possible to control the mechanism from behind, the arrangement shown in the drawings, especially FIGS. 7 and 8, is preferable.

Figure 5:
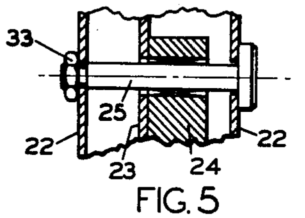
FIG. 5 is a sectional view taken on the plane 5—5 of FIG. 4

The bottom mechanism 21 is essentially the same as the top mechanism 20. The components 22′–32′ of the bottom mechanism 21 are identical to those of the top mechanism 20 having the same reference numerals without primes, except for a few minor differences mentioned below. Each guide pin 25 of the top mechanism 20 is conveniently held in place by a nut 33 as indicated in FIG. 5, while each guide pin 25′ in the bottom mechanism 21 is more conveniently held in place by a threaded connection to the housing 22′ as indicated at 34 in FIG. 7. The housing 22 of the top mechanism 20 is connected at its lower end to the platen 11 as is indicated at 35 in FIG. 6, while the housing 22′ of the bottom mechanism 21 is connected at its upper end to the platen 11 as is indicated at 36 in FIG. 8. The housing 22′ of the bottom mechanism 21 differs from the housing 22 of the top mechanism 20 in that the housing 22′ is cut off just below the shoulder screw 32′. The thumbscrew 26′ is mounted in the housing 22′ so as to extend toward the back of the bottom mechanism 21 as shown in FIG. 8, rather than to the front as in the top mechanism 20 shown in FIG. 6. For convenience in reaching and turning the handles 28′ in the bottom mechanism 21, a knob 37 preferably is provided on each handle 28′. While the angle support 23′ and the guide member 24′ of the bottom mechanism 21 are mounted in the same positions as are the angle support 23 and guide member 24 of the top mechanism 20 (as is apparent from FIG. 8 and FIG. 6), the clamp jaws 29′, 30′ are positioned in the bottom mechanism 21 in the position that is upside down as compared to the position of the clamps 29, 30 of the top mechanism 20, so that the opening between the clamp jaws 29′, 30′ is in the upward direction to receive the paper 13. The operation of the bottom mechanism 21 is identical to that of the top mechanism 20, except that it is controlled from behind rather than from in front.

The paper holding and positioning apparatus 10 is employed in the following manner:

The paper 13, which preferably is a good grade of map paper, is placed roughly in position on the platen 11. The machine direction, or "grain," of the paper 13 is in the horizontal direction. The paper 13 is inherently stable in the machine direction, and need not be stressed in this direction; especially where, as in the typical apparatus described herein, the horizontal direction on the charts represents the independent variable, such as time. The charts 14—14 have been printed on the paper 13 in a predetermined manner such that portions of them will coincide with the guide lines 15—15 when the paper 13 is correctly positioned and sufficiently stretched. Lights (not shown) preferably are provided behind the platen 11 to facilitate lining up the appropriate markings on the paper 13 with the guide lines 15—15 on the platen 11, and to aid in reading the charts 14—14.

The thumbscrews 26, 26′ of the top and bottom mechanisms 20, 21 are turned until the jaws of the clamps 29, 30 and 29′, 30′ open. The paper 13 is slipped between the open jaws at both top and bottom, and is roughly positioned relative to the guide lines 15—15. The thumbscrews 26 of the top mechanism 20 are turned by the handles 28 until the clamps 29, 30 close against the top end of the paper 13. The thumbscrews 26′ of the bottom mechanism 21 are turned by the handles 28′ until the clamps 29′, 30′ close against the bottom end of the paper 13. The thumbscrews 26, 26′ are then further tightened and adjusted on both sides at both top and bottom, in any convenient order, until the paper is precisely positioned relative to the guide lines 15—15.

The same thumbscrews 26, 26′ in the clamping and positioning mechanisms 20, 21 first cause the clamps 29, 30 and 29′, 30′ to close against the paper 13; and then after the paper 13 is tightly clamped, they stretch the paper 13. When the paper 13 is finally stretched into position, it is under very high tension, which holds it tight against the flat platen 11. As humidity changes, the tension increases and decreases, and the paper 13 would thus tend to shrink or expand. However, the paper 13 cannot shrink or expand, since it is firmly held to the proper dimension. The clamps 29, 30, 29′, 30′ do not permit the paper 13 to shrink, and the amount of pre-stretch they provide in the paper 13 is enough to assure that even under the most extreme conditions of humidity it cannot become loose, because it is stretched farther than it would ever expand of its own accord even under the most extreme conditions.

Figure 21:
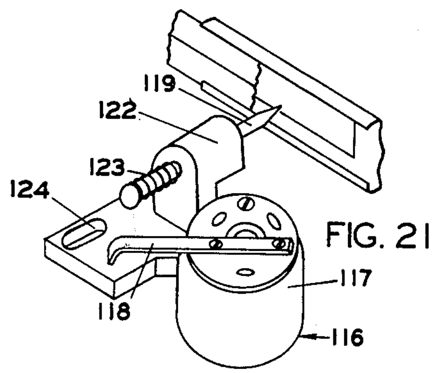
FIG. 21 is a perspective view of a printing mechanism according to the present invention.

The actual recording is done by means of a print-bar 115 which scans vertically across the paper 13. Inside this print-bar 115 (shown in FIG. 9) at each column location are printing mechanisms 116 (shown in FIG. 21) each consisting of a solenoid 117 that actuates a print-hammer 118. The hammer 118 strikes a printer 119 that acts like the "period" key on a typewriter and prints dots through an ink impregnated ribbon 120 such as a typewriter ribbon onto the chart 14. The dots are slowly displaced to the right with time to form continuous lines 121 (FIGS. 1 and 2) representing the recorded variables.

The solenoids 117—117 utilized are preferably rotary-type selected for extremely high speed of response and long life. The printers 119—119 are sharpened steel pins which slide through a small clearance hole bored in a guide block 122. The pins 119—119 are normally held away from the paper by a spring 123; to print the dot the printer 119 is driven against the ribbon 120 and paper 13 by a blow from an arm or hammer 118 mounted on the rotary solenoid 117. The guide block 122 is mounted with slotted holes 124—124 to allow precise adjustment of the printing point.

All solenoids 117—117 and hammers 118—118 are mounted on a single chassis 125 which is driven to the right by a single time drive motor 126. The chassis 125 slides on rods 127 which are fastened to the main frame 128 of the print-bar 115. The chassis 125 is pulled across by means of a fine cable 129 which is driven through a slip-clutch (not shown) and pulley 130 arrangement by a small synchronous motor 126 of the "chart-drive" type. The time drive motor 126 and clutch are mounted underneath the platen 11 on the main casting at the left end of the print-bar assembly 115.

A single ink impregnated ribbon 120 passes underneath all the printers 119—119 in the print-bar 115. A spool 135 containing a large supply of ribbon 120 is mounted at one end of the print-bar 115 and a similar take-up spool 136 is mounted at the opposite end of the print-bar 115. The ribbon 120 pays off over idler pulleys 137—137, passes through a guide channel 138 across the full length of the print bar 115, and is taken up on the take-up spool 136. The ribbon is indexed ahead by means of a ratchet mechanism 139 which drives pinch rolls 142 and the take-up spool 136 each time the print-bar 115 makes one complete sweep up and back across the chart 13.

Figure 22:
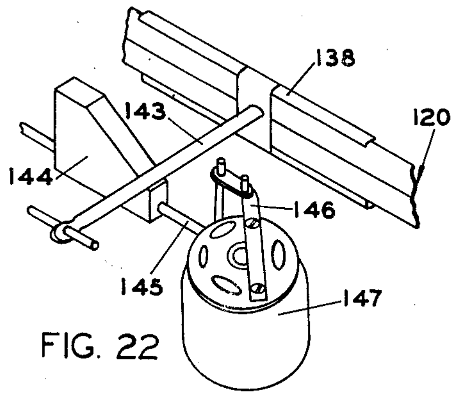
FIG. 22 is a perspective view of the mechanism for changing color on two color ink impregnated ribbon.

For multi-color recording, a two-color, or four-color ribbon 120 is used. The colors are changed by shifting the guide-channel 138 through which the ribbon 120 passes underneath the printers 119—119. This channel 138 is mounted to the chassis 125 by means of pivoted arms 143 (shown in FIG. 22). These arms 143 are lifted to the various positions by means of cam-blocks 144 which are mounted on a rod 145 actuated through a linkage 146 by a rotary solenoid 147 at one end of the print-bar 115. For a two-color unit, one of these solenoid 147 and cam-block 144 assemblies provides two positions for the ribbon guide channel 138. For three and four-color operation, two of these assemblies are provided with a solenoid 147 at each end of the print-bar 115. This provides up to four positions as follows: Solenoid A and B out, solenoid A in B out, solenoid A out B in, solenoid A and B both in. Under normal sequencing, one sweep of the print-bar 115 over all chart-frames 14—14 is made with the ribbon 120 in one position, hence, recording in one color. At the end of that sweep, the ribbon 120 is shifted to the next color.

The frame of the print-bar 115 is a beam mounted on castings 150—150 at each end. The castings 150—150 contain bushings 151 which slide vertically on hardened and ground shafts 152. The shafts 152 extend from the top to the bottom of the recorder frame 104 and are held in rigid alignment by cast mounting blocks.

Figure 9:
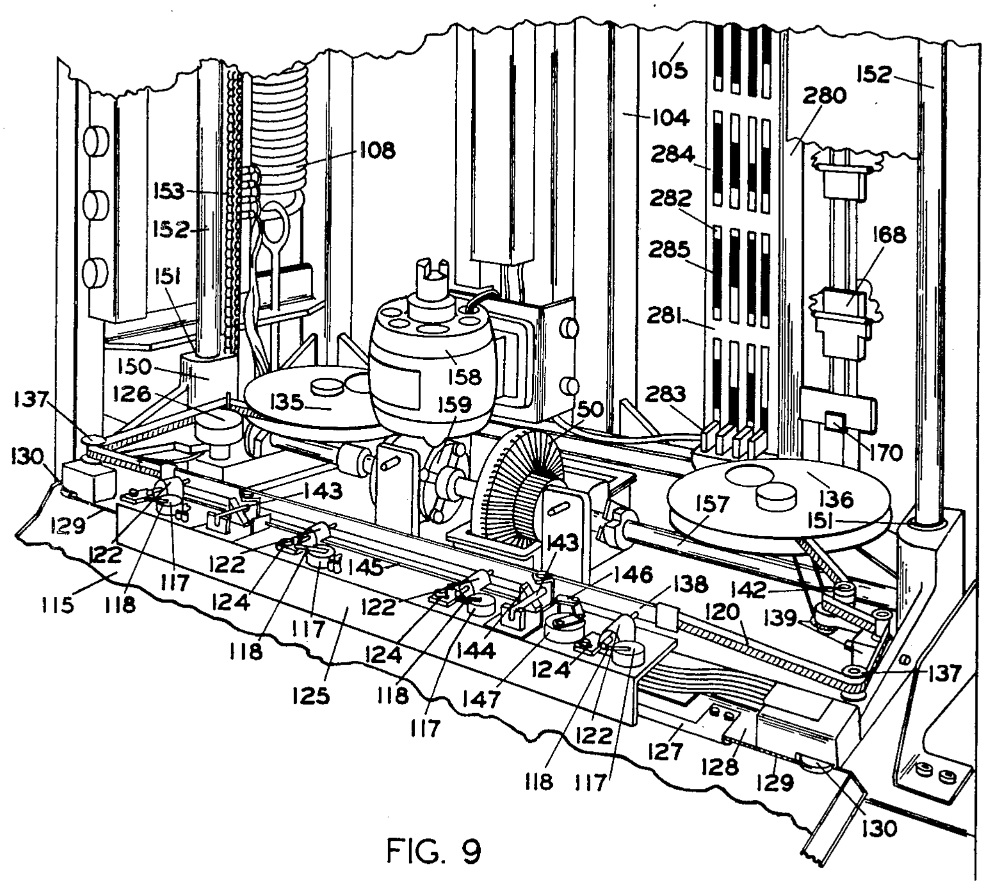
FIG. 9 is a perspective view of the mechanism that operates the print-bar.

The casting 150 at one end of the print-bar 115 (the left as shown in FIG. 9) carries with it the following units: the time drive motor 126, the time drive slip-clutch and pulley arrangement 131, and the ribbon supply spool 135. The casting 150 at the opposite end (shown at the right end in FIG. 9) carries the take-up spool 136 and the ratchet mechanism 139 which indexes ahead the ribbon 120.

A chain drive is provided to cause the print-bar 115 to scan across the chart 13. A separate chain 155 drives each casting 150; both chains 155—155 are driven by sprockets mounted at the bottom of the recorder cabinet on a common drive-shaft 157.

A continuous loop of chain 155 traveling in a vertical plane is mounted at each end of the print-bar 115. The print-bar casting 150 is clamped to its respective chain 155; the chain 155 is not broken at that point. A constant tension is maintained on the chain loop 155 by means of a spring loaded idler sprocket (not shown) in the upper rear of each side of the recorder cabinet.

The main drive shaft 157 is driven by a motor 158 with integral worm gear reduction. Since the recorder 101 is a sweep-balance recorder, this motor 158 drives at practically constant speed as the print-bar 115 passes over the chart 13, and the motor 158 need not rapidly accelerate, decelerate, and reverse.

The commutator voltage divider 50 is mounted coaxially around the drive shaft 157. The brush arm 87 of the commutator 50 is pinned to the drive shaft 157 so that slippage is impossible. Hence, there is a precise position of the brush arm 87 on the commutator for every position of the drive shaft 157, and in turn for every position of the print-bar 115 in its sweep over the chart 13. The sprocket and chain ratio is such that the drive shaft 157 makes precisely one revolution as the print-bar 115 moves over the distance from the top of one chart-frame 14 to the top of the next. Hence, there is one point on the periphery of the commutator 50 corresponding precisely to each point across each chart-frame 14.

The measuring circuit of the recorder 101 may be either a potentiometer of classic configuration or a Wheatsone bridge, depending upon application. The potentiometer circuit will be used to measure voltage or currents, and the Wheatstone bridge to measure resistance.

Characteristic of either a potentiometer or a Wheatstone bridge circuit is the use of a precision voltage divider or "slide wire" which is mechanically linked to the indicator or recorder. The recorder 101 is no exception to this general rule. As was stated, there is a commutator type of voltage divider 50 mechanically linked to the travel of the print-bar 115 across the recording chart 13 so that there is a position on the periphery of the commutator 50 corresponding precisely to each point on the recording chart-frame 14.

Where it is desired to scan repeatedly over a range of voltages or impedances, scanning in a continuous manner generally is not feasible because the friction of the moving contact on the impedance element causes appreciable electrical noise and soon wears out the potentiometer or rheostat. For such purposes, therefore, it is customary to use stepwise scanning through the range of impedances or voltages by means of fixed contacts connected to spaced points on the impedance. The fixed contacts and the slidable contact can all be made of materials having high conductivity and good resistance to wear such as, for example, coin silver bars.

In a common form of such device the fixed contacts may be arranged in a circle as are the commutator segments in a motor or generator, and the sliding contact may be in the form of a brush such as is used in a motor or generator. Although the contacts connected to the impedance are referred to above as the fixed contacts, in rotating devices such as those mentioned above they would ordinarily be the contacts that move, and the brush would remain stationary. As far as the electrical circuit is concerned, however, it is immaterial which contact or contacts move, as long as there is relative sliding movement between them.

Because of various physical limitations and cost considerations, there is a practical limit to the number of taps that can be employed in stepwise electrical tapping devices. Where it is desired to divide a given voltage or impedance range into a large number of discrete steps it would be desirable in many cases to be able to provide more steps than the highest practical number of taps, or the highest practical number of commutator segments, whichever is the limiting factor. It is known that the number of steps can be made substantially twice the number of taps where an impedance is provided between each tap and its respective contact. In a voltage divider circuit of this type, when the movable contact bridges two adjacent fixed contacts the voltage on the movable contact is midway between that of each fixed contact where the impedances connecting the fixed contacts and their respective taps on the main impedance are equal.

It has been found in the present invention that by providing a plurality of movable contacts, properly staggered, the number of steps can be increased to at least substantially four times the number of taps. More specifically where two movable contacts are used, the number of steps is substantially four times the number of taps, where three are used the number of steps is substantially six times the number of taps, and similarly where more movable contacts are employed the number of steps is substantially twice the number of movable contacts times the number of taps.

Figure 10:
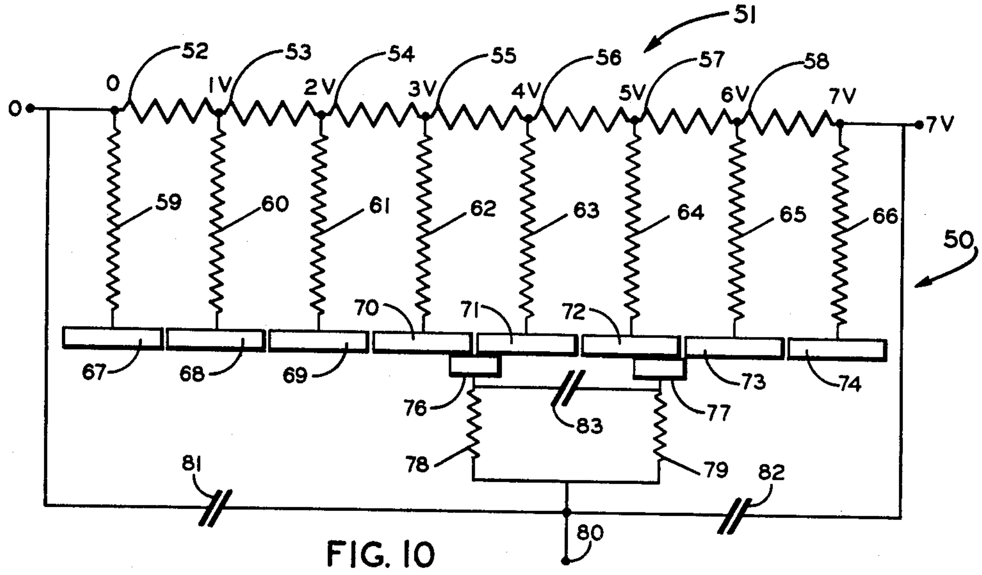
FIG. 10 is a schematic diagram illustrating a typical embodiment of a commutator according to the present invention.

FIG. 10 is a schematic diagram illustrating a typical embodiment of the voltage divider and FIGS. 11–19 illustrate various principles involved in the voltage divider 50.

Referring to FIG. 10, a typical electrical device 50 of the impedance and voltage divider type comprises a series impedance member 51 comprising the individual impedance segments 52–58. Where equally spaced essentially stepwise tapping is desired, the impedances 52–58 should all be equal. Connected to the ends of the impedance member 51 and to the junctions between successive segments 52–58 are a plurality of impedances 59–66 having impedances that are substantially equal to each other; and preferably substantially higher than the impedances of the segments 52–58, to avoid inequalities in the steps that might result if the impedances 59–66 were low enough relatively to provide a substantial reduction in the impedance between junctions of the impedance segments 52–58 during times when certain of the adjacent impedances 59–66 are connected together and thus shunt one or more of the segments 52–58. The opposite ends of the impedances 59–66 are connected respectively to electrical contacts 67–74.

The contacts 67–74 are all substantially equal in length and substantially equally spaced, preferably closely, from their adjacent contacts. Thus the distances between the corresponding ends of successive contacts 67–74 are substantially equal. The electrical contacts 67–74 are arranged so that together they form a contact surface such as a plane or preferably a cylindrical surface (which is most adaptable for use in the recorder 101) whereon a slidable contact can be positioned and moved lengthwise relative to the surface to contact at least one of the electrical contacts 67–74 at any position on the surface.

A pair of slidable contacts 76–77 are held, preferably with resilient means such as springs (not shown), at a fixed lengthwise spacing from each other along the contact surface 67–74; and are slidable relative to the surface in either direction. The length of each slidable contact member 76–77 is one-half the distance between the corresponding ends of successive contacts 67, 68; 68, 69; 69, 70; etc. The distance between the nearest edges of the slidable contacts 76, 77 is 1¼ times the distance between the corresponding ends of successive contacts 67, 68 etc.

One end of a coupling impedance 78 is connected to the slidable contact 76, and the other end is connected to a point 80. One end of a coupling impedance 79 is connected to the slidable contact 77, and the other end is connected to the point 80. One side of a capacitor 81 is connected to one end of the impedance member 51, and the other side is connected to the point 80. One side of a capacitor 82 is connected to the opposite end of the impedance member 51, and the other side is connected to the point 80. One side of a capaictor 83 is connected to the slidable contact 76, and the other side is connected to the slidable contact 77. For convenience in discussion it will be considered that a potential of seven volts is applied across the impedance member 51, and the voltage across each impedance segment 52–58 thus is one volt, the potentials at the various junctions being as indicated in FIG. 10, ignoring any slight loading effect from the brushes and associated impedances.

Figure 11:
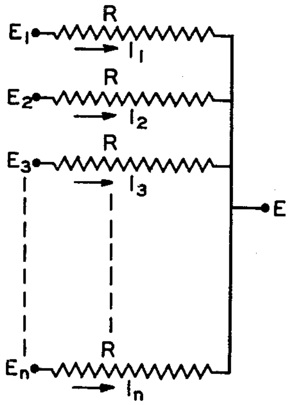
FIG. 11 is a schematic diagram illustrating one of the principles involved in the commutator.

To understand the operation of the voltage divider 50 it is helpful to consider the diagram of FIG. 11, wherein $E, E_1, E_2, E_3, \ldots E_n$ represent voltages (potentials), $I_1, I_2, I_3, \ldots I_n$ represent currents, and R represents impedance, which for simplicity will be considered to be a pure resistance, the impedances of all of the elements shown in FIG. 11 being equal. From elementary theory it is apparent that $$\begin{aligned} E &= E_1 - RI_1 \\ &= E_2 - RI_2 \\ &= E_3 - RI_3 \\ &\vdots \\ &= E_n - RI_n \end{aligned}$$

from which $$nE = E_1 + E_2 + E_3 + \ldots + E_n - R(I_1 + I_2 + I_3 + \ldots + I_n)$$

Where no current passes the point at E, $$I_1 + I_2 + I_3 + \ldots + I_n = 0$$

and $$nE = E_1 + E_2 + E_3 + \ldots + E_n$$

Thus the voltage E is the arithmetic mean, or more loosely the "average," of the voltages $E_1, E_2, E_3, \ldots E_n$.

Figure 12:
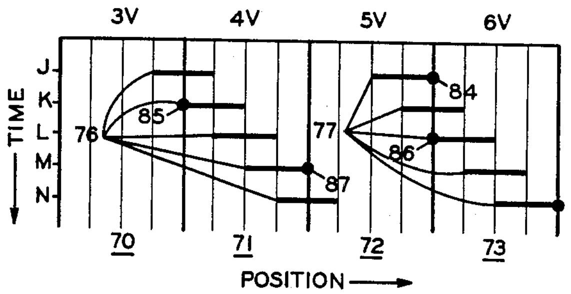
FIGS. 12–19 are semi-pictorial, schematic views, in the general nature of graphs, illustrating the principles of the staggered contacts in the commutator.

If current is drawn through the point at E, as is the case in some rheostat applications, the above equations do not apply exactly, and the voltage E is not precisely the arithmetic mean of the individual voltages; but it is very close thereto. As long as the impedances 59–66, 78, 79 are substantially larger than the impedances of the segments 52–58, the loading effect is small and any variation from the above equations is negligible.

Where essentially stepwise electrical tapping is desired, the capacitors 81–83 are omitted from the circuit of FIG. 10. Referring to FIGS. 10 and 12 the circuit of FIG. 10 without the capacitors 81–83 operates in accordance with the following explanation.

In FIG. 12 the heavy vertical lines represent the insulation or space between contacts in the contact surface, and the blank spaces between the heavy vertical lines represent the contacts 70, 71, 72, 73, which have the potentials 3 volts, 4 volts, 5 volts, and 6 volts, respectively, as indicated, when not shorted to an adjacent contact. The heavy horizontal lines represent the slidable contacts 76, 77, as indicated, at successive positions on the contacts 70–73. Considering the contacts 76, 77 to be moving uniformly to the right, with time indicated in the vertical direction and increasing as one reads down on the diagram, it is seen that just before time J the contact 76 was at a potential of 3.5 volts, the contact 77 was at a potential of 5 volts, and the point 80 thus was at a potential of 4.25 volts, the arithmetic mean between the voltages at the contacts 76, 77.

At time J the contact 77 makes connection with the contact 73 as well as the contact 72, as is indicated by the heavy dot 84. This raises the potential at the contact 77 to 5.5 volts, and the potential at the point 80 thus is raised to 4.5 volts, since the contact 76 is still at the same potential as it had just before the time J. At time K the contact 77 remains at the same potential, 5.5 volts, but the contact 76 breaks its connection with the contact 70, as is indiacted by the heavy dot 85, and thus its potential is increased to 4 volts, and the potential of the point 80 is increased to 4.75 volts. Similarly at time L, with the potential of the contact 76 remaining the same, the potential at the contact 77 increases one-half volt as it breaks connection with the contact 72, as is indicated by the heavy dot 86, and the voltage at the point 80 is increased one-fourth volt to the new potential of 5 volts. In like manner, with the potential of the contact 77 remaining the same, the contact 76 at time M makes connection with the contact 72, as is indicated by the heavy dot 87, raising its potential by one-half volt and the potential of the point 80 by one-fourth volt. Finally, at time N the potential at the point 80 is raised another one-fourth volt in similar manner, so that it is now at a potential one volt greater than its potential at time J, the contacts 76, 77 being in the same corresponding positions as they were at time J, but each at a one volt higher potential.

From FIGS. 10 and 11 and the above discussion, it is apparent that as the contacts 76, 77 move together one-fourth the distance between the corresponding ends of successive contacts 67–74, one of the contacts 76, 77 either makes or breaks a connection, and thus changes its potential by one-half volt and the potential of the point 80 by one-fourth volt. The action is the same in either direction.

Figure 13:
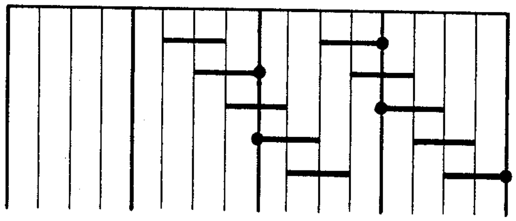

In FIG. 13, which is the same type of diagram as FIG. 11, with legends and reference numerals omitted for convenience, it is apprent that the same action takes place. In every movement of one-fourth the distance between corresponding ends of successive contacts 67–74 the contacts 76, 77 take turns making or breaking a connection, thus raising one of the individual voltages one-half volt, and the average voltage, at the point 80, one-fourth volt. In FIG. 13 the spacing between the contacts 76, 77 is three-fourths the distance between the corresponding ends of successive contacts 67–74. The action is similar for any spacing of an odd number of quarters of the distance between the corresponding ends of successive contacts 67–74. The spacing must be at least three-fourths of that distance, however. Otherwise three successive contacts 67–74 would be shorted at the wrong time in some positions, and this would provide a conflicting action. In other words, the distance between the contacts 76, 77 may be ¾, 5/4, 7/4, 9/4, or any higher odd number of fourths of the distance between the corresponding ends of successive contacts 67–74. The lengths of the contacts 76, 77 may be increased to 3/2, 5/2, 7/2, or any odd number of halves of the distance between the corresponding ends of successive contacts 67–74; since the action is the same as that described and illustrated in FIGS. 12 and 13, except that the longer contacts short out one or more of the contacts 67–74 in addition to those as indicated in FIGS. 12 and 13. The alternate making and breaking of connections with every movement of one-fourth the distance between the corresponding ends of successive contacts 67–74 still takes place, however, in the same manner as illustrated in FIGS. 12 and 13.

For three or more slidable contacts the spacing principle is the same, and may be generalized by stating that successive slidable contacts are spaced any number of halves times the distance between the corresponding ends of successive contacts 67–74 plus an equally spaced or even staggering over such a half distance. In the case of three contacts, the closest spacing is two-thirds of the distance between the corresponding ends of successive contacts 67–74. Stated differently, this is one-half the aforementioned distance plus one-sixth of that distance; or still differently, one-half the distance plus ⅓ of ½. This spacing is illustrated in FIG. 15.

Figure 15:
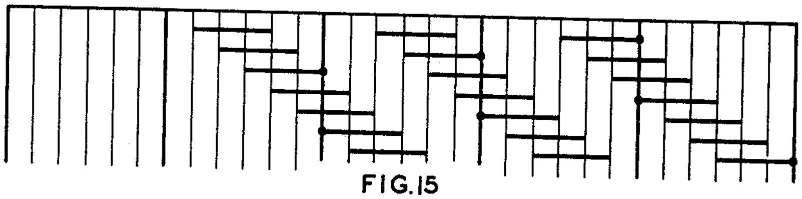

From FIG. 15 it is apparent that every ⅙ distance of movement across a contact 67–74 causes one of the slidable contacts to make or break a connection, and that the contacts take turns so that in every half distance of movement each has made or broken a connection. In the next half distance of movement each slidable contact successively makes or breaks (the opposite of what it did in the first half distance of movement); bringing the slidable contacts back to the same corresponding position as before the movement, but with each moved over the length of one contact 67–74.

Figure 14:
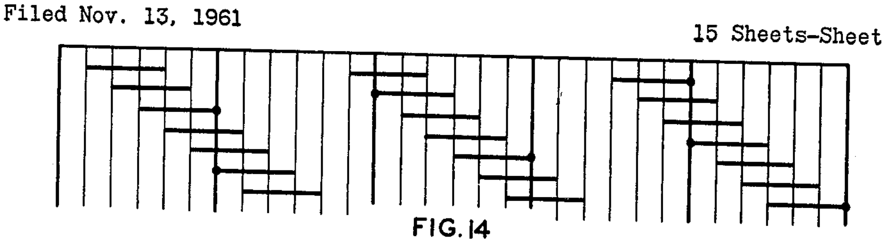
Figure 16:
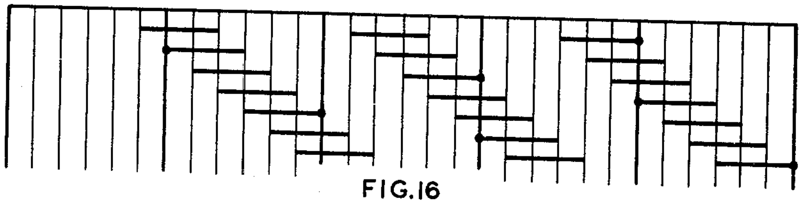

FIGS. 14 and 16 illustrate other convenient spacings for three slidable contacts. In FIG. 14 the spacing is 1⅙ of the distance between the corresponding ends of successive contacts 67–74; and in FIG. 16 the spacing is ⅚ of the aforementioned distance, which is ½ plus ⅔ of ½. The staggering is equal in this case also because with the middle contact spaced from the right-hand contact by ½ plus ⅔ of ½, and the left-hand contact spaced from the middle contact by the same distance, the spacing between the left-hand contact and the right-hand contact thus is 4/2 plus ⅓ of ½.

Figure 17:
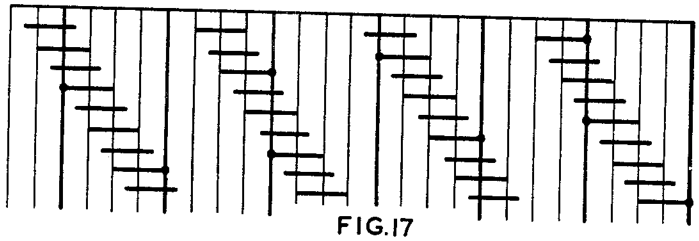
Figure 18:
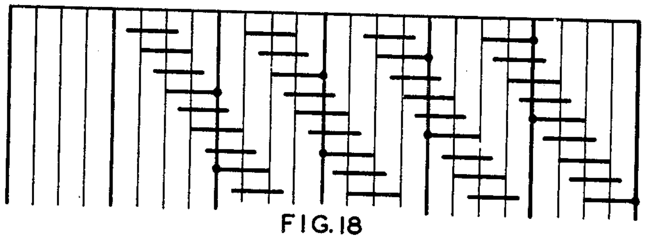
Figure 19:
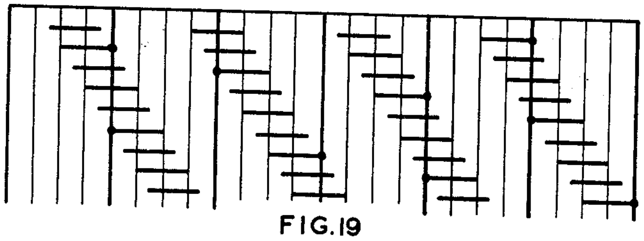

FIGS. 17–19 illustrate similar action where four slidable contacts are employed. Here the spacing between successive slidable contacts is any number of halves of the distance between the corresponding ends of successive contacts 67–74 and fourths of that half distance such that the slidable contacts are staggered from the others by ¼ and ½ of the half distance. In FIG. 17 the spacing is 1⅛ of the distance between the corresponding ends of successive contacts 67–74; in FIG. 18 the spacing ⅝ of the aforementioned distance; and in FIG. 19 the spacing is ⅞ of the aforemention distance. From FIGS. 17–19 it is apparent that these spacings provide uniform or even staggering such that for every movement of ⅛ (¼ of ½) the distance between the corresponding ends of successive contacts 67–74 the slidable contacts take turns making and breaking connections, changing one of the four potentials by ½ volt, and the average potential by ⅛ volt.

To generalize, for any number of slidable contacts, the length of the contacting surface of each slidable contact member in the lengthwise slidable direction is equal to an odd integral multiple of one-half the distance along the lengthwise slidable direction between the corresponding ends of successive contacts 67–74, and then the distance in the lengthwise slidable direction between the nearest edges of successive slidable contacts is equal to an integral multiple of one-half the distance along the lengthwise slidable direction between the corresponding ends of successive contacts 67–74 plus a friction of said half distance, wherein the denominator of the fraction is the number of said slidable contacts and the numerator is an integer such that the sum of any said numerator plus any at least one other said numerator equals an integer different from the denominator and any multiple thereof. The above generalization is intended to indicate in more precise terms what is meant by the equally spaced or even staggering within a half distance, as discussed above.

Referring back to FIG. 10, where it is desired to approach a continuous voltage change rather than a stepwise change, the capacitors 81 and 82, connected between the point 80 and the ends of, or any other desired points on, the impedance member 51, may be included in the circuit. The voltage across a capacitor cannot change instantaneously. It can change only gradually according to an exponential function, at a rate dependent upon the capactance and other circuit values affecting the "time constant." The values of the capacitances 81, 82 can be chosen such that the time constants for the various positions of the slidable contacts 76, 77 provide a fairly smooth, rather than a stepwise, change of voltage at the normal operation speed of the slidable contacts 76, 77.

Still further smoothing of the voltage at the point 80 as a function of position of the contacts 76, 77 moving at their normal speed can be provided by including also the capacitor 83 connected between the slidable contacts 76, 77 (and with additional capacitors between other pairs of contacts where more than two slidable contacts are employed), since the capacitor 83 similarly causes the potential between the contacts 76, 77 to change gradually rather than instantaneously when one of the contacts 76, 77 makes or breaks a connection. The capacitor 83 should not be used between any contacts that are spaced less than the distance between the corresponding ends of successive contacts 67–74, because shorting of the capacitors at certain positions would result in arcing.

Where it is desired that the stepwise tapping, or the smoothed tapping with the capacitors added, is to be directly proorptional to the position of the slidable contacts (or as a function of time where the slidable contacts are moved at a uniform speed) the impedances of the segments 52–58 should be equal and the staggering of the slidable contacts should be even, as discussed above. Where it is desired to obtain a different function of voltage or impedance, either in a stepwise or a substantially continuous manner, the impedances of the segments 52–58 may be made unequal in a predetermined manner or the staggering of the slidable contacts may differ from that specified above, or both. Such variations are considered to be within the scope of this invention, but are too numerous to be discussed individually. The impedances 59–66 could even be made unequal in a predetermined manner to provide certain functions, as could the impedances 78, 79, and other coupling impedances where more than two slidable contacts are employed. Ordinarily the impedance segments 52–58, the impedances 59–66 and the coupling impedances 78, 79 would be substantially pure resistances, especially in direct current circuits, but other types of impedance could be employed where desired. For convenience, only seven impedance segments 52–58 are shown in FIG. 10. In practice, a hundred or more such impedance segments are more typical. Any desired number, of course, may be used.

The foregoing description of the commutator 50 indicates a construction and method used to provide variable voltages or currents within the recorder that are known, for comparison to various unknown voltages or currents outside the recorder (or known and unknown resistances). The distance increments on the ordinate of the chart frames 14 corresponds to increments of the voltage provided by the commutator 50 since, as the voltage is changed by movements of the commutator 50, the print-bar 115 is moving over the chart 13. The voltage is varied from minimum to maximum (by a complete revolution of the commutator 50) each time the print-bar 115 passes over a chart-frame 14. Since each chart-frame 14 can have a plurality of variables recorded thereon, each in a different color, and there are a number of columns 102 and rows 103 of the chart-frames 14—14, there must be means for insuring that they are recorded on the proper chart-frame.

In the embodiment of the recorder 101 shown in FIG. 2, there are four vertical columns 102—102 and eight horizontal rows 103—103. The print-bar 115 supports one printing mechanism 116 for each column 102 (four printing mechanism 116—116 in all) so that one printing mechanism 116 prints the curves 121—121 for the eight chart-frames 14—14 in its own particular column 102. Thirty-two variables are recorded using a single color for printing, sixty-four variables with two colors, one hundred and twenty-eight with four colors, etc.

Assuming that one color of printing is to be used and thirty-two variables to be recorded and that the print-bar 115 is started at the bottom of the chart 13, on the first upward sweep of the print-bar 115, the chart-frames 14—14 in the first left hand column 102 are printed. The commutator 50 makes eight revolutions corresponding to the eight chart-frames 14—14 in the first left hand columns 102. On the return or downward sweep of the print-bar 115, the chart-frames 14—14 in the second column 102 from the left are printed with the commutator 50 again making eight revolutions corresponding to the eight chart-frames 14—14. In like manner the chart-frames 14—14 of the third column 102 are printed on the next upward sweep of the print-bar 115 and the chart-frames 14—14 of the fourth column 102 are printed on the following return or downward sweep of the print-bar 115. The number of sweeps of the print-bar 115 necessary to cover all the chart-frames 14—14 corresponds to the number of columns 101—102. The total number of commutator revolutions corresponds to the number of chart-frames 14—14.

In two-color printing the numbers of variables, print-bar sweeps, and commutator revolutions are doubled. In three-color printing these numbers are tripled, in four-color printing, quadrupled, etc.

The reference signal of the commutator 50 and each input signal must be properly matched and, on null detection, provided to the proper printing mechanism 116 when it has arrived at the chart-frame 14 upon which the particular input signal is to be recorded.

The scanning switching of the multiple input signals to the recorder 101 is done in a uniquely trouble-free manner. As the recorder 101 switches from point to point, a total of four functions must be switched: (1) and (2) both sides of the input signal (3) the zero suppression of the particular range appropriate for that variable, and (4) the span of that measuring range. These four functions can be switched by "pulling in" at the appropriate time 3 single pole, single throw switch contacts. In the recorder 101, these switch contacts are magnetic reed switches of a type recently developed by Bell Telephone Laboratories. These magnetic reeds are sealed in glass capsules in an inert gas atmosphere and the switch contacts themselves are of a gold alloy. The resulting switches have been tested through billions of operations without failure and are unique in low noise dependability.

Figure 20:
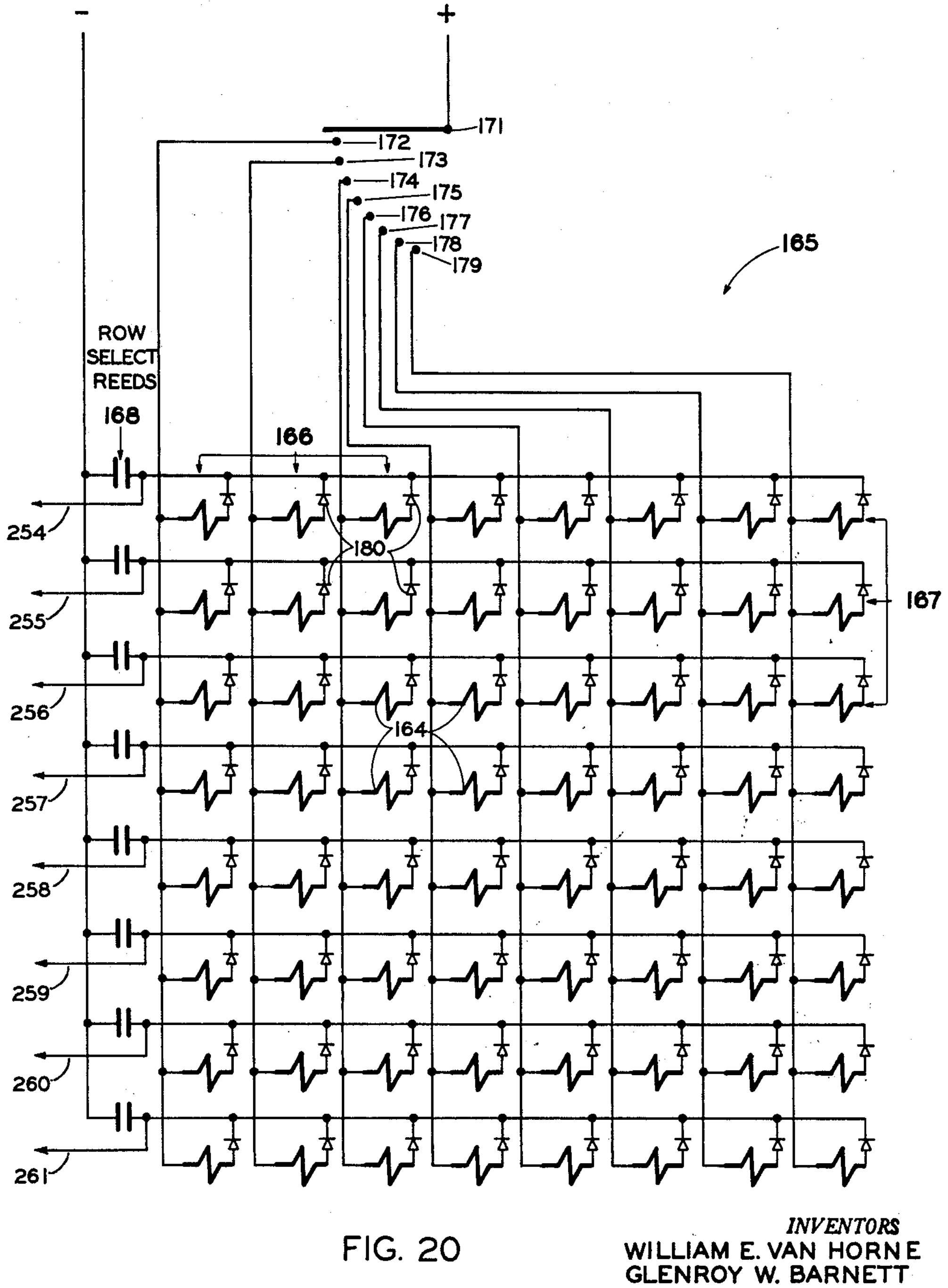
FIG. 20 is a schematic diagram illustrating the relay matrix for controlling row and column selection by the print-bar.

Referring to FIG. 20, the signal relays 164—164 are laid out in a matrix 165 in columns 166—166 and rows 167—167 exactly analogous to the layout of chart-frames 14—14 on the recorder chart 13. If FIG. 20 is compared to the chart 13 of FIG. 2, however, it is noted that there are twice as many columns 166—166 of signal relays 164—164 as there are columns 102—102 of chart-frames 14—14. Therefore, the example of the signal selector matrix 165 shown in FIG. 20 may be used for two-color printing on a thirty-two chart-frame chart corresponding to the example shown in FIG. 2. The same matrix could also be used for single color printing on an eight-column, eight-row chart.

One side of all the relay coils of the signal relays 164—164 in a horizontal row 167 are connected together and the other side of all the coils in a vertical column 166 are likewise connected together. When voltage is applied between the common lead from a horizontal row 167 and the common lead from a vertical column 166, this voltage appears across the one coil which lies at the intersection of the particular row 167 and column 166 selected. This, then, is the one coil actuated at that instant.

At any instant the variable being measured by the recorder 101 must obviously lie in the horizontal row 103 then being swept by the print-bar 115. In order to insure that this is always the case, the row selector 168 is a magnetic reed switch 169 (shown in FIG. 9) physically mounted inside the recorder 101 behind the particular row 103 involved. A magnet 170 is mounted on the print-bar frame 128 in such a position that it sweeps across the row-selector reed 169 as the print-bar 115 sweeps across the chart 13. This row-selector reed 169 is the switch which energizes the common lead to all the signal relays in a row 167. Hence, it is impossible for the signal selector 165 to get out of step with the print-bar 115 in this system.

The column selector utilized for the signal selector matrix 165 depends upon the configuration of the specific system. In some systems, a single measuring circuit is programmed among each of the columns 166 in sequence.

In this type of system, a stepping switch 171 is provided which selects the appropriate column 166. This stepping switch 171 is provided with sufficient contacts 172–179 so that it simultaneously selects the column 167 of signal relays 164 to be energized and also the appropriate print solenoid 117 to which the print pulse must be directed. The stepping switch 171 is caused to index ahead one step when the print-bar 115 reaches the end of one upward or downward sweep and pulls in a limit switch (not shown) at top or bottom.

A rectifier 180 connected in series with each signal relay 164, as shown in FIG. 20, prevents the energization of any relay 164 other than the one intended to be energized at a given time. This is accomplished by blocking the current that would otherwise flow through various roundabout paths, at one point at least in each such possible path.

If the signal selector matrix 165 of FIG. 20 were to be used for the chart 13 shown in FIG. 2, two variables in two colors would be printed on each chart-frame 14—14. This could be done by energizing the rotary solenoid 147 (causing ribbon shift) each time the print-bar 115 travels downward (in which case the chart-frame 14—14 of one column 102 would have two variables recorded in two colors on an up and down sweep of the print-bar 115 with one color printed on the up sweep and a second color on the down sweep), or the rotary solenoid 147 could be energized during four consecutive sweeps of the print-bar 115 and de-energized during the following four consecutive sweeps of the print-bar 115 (in which case the first thirty-two variables would be printed in one color on the thirty-two chart-frames 14—14 sweeping the entire chart 13 and the second thirty-two variables would be recorded in a second color on the same thirty-two chart-frames 14—14 as the entire chart 13 is swept a second time).

In an alternate configuration of the system, a separate measuring circuit may be provided for each vertical column. In this event, there is no column selector utilized; all columns are always in use on every sweep of the print-bar. Thus, all print solenoids operate independently of the others and a point is printed in every chart-frame on each sweep.

The measuring circuit of the apparatus of this invention is essentially of the potentiometer or Wheatstone bridge type, depending upon the application. The potentiometer circuit is used to measure voltages and currents, and the Wheatstone bridge to measure resistance. Characteristic of either a potentiometer or a Wheatstone bridge circuit is the use of a precision voltage divider or "slide wire" which is mechanically linked to the indicator or recorder. The voltage divider or commutator 50 described previously herein, is used in the bridge circuit of this invention. The commutator 50 is mechanically linked to the travel of the print-bar 115 across the recording chart 13 so that there is a position on the periphery of the commutator 50 corresponding precisely to each point on each recording chart-frame 14.

Figure 23:
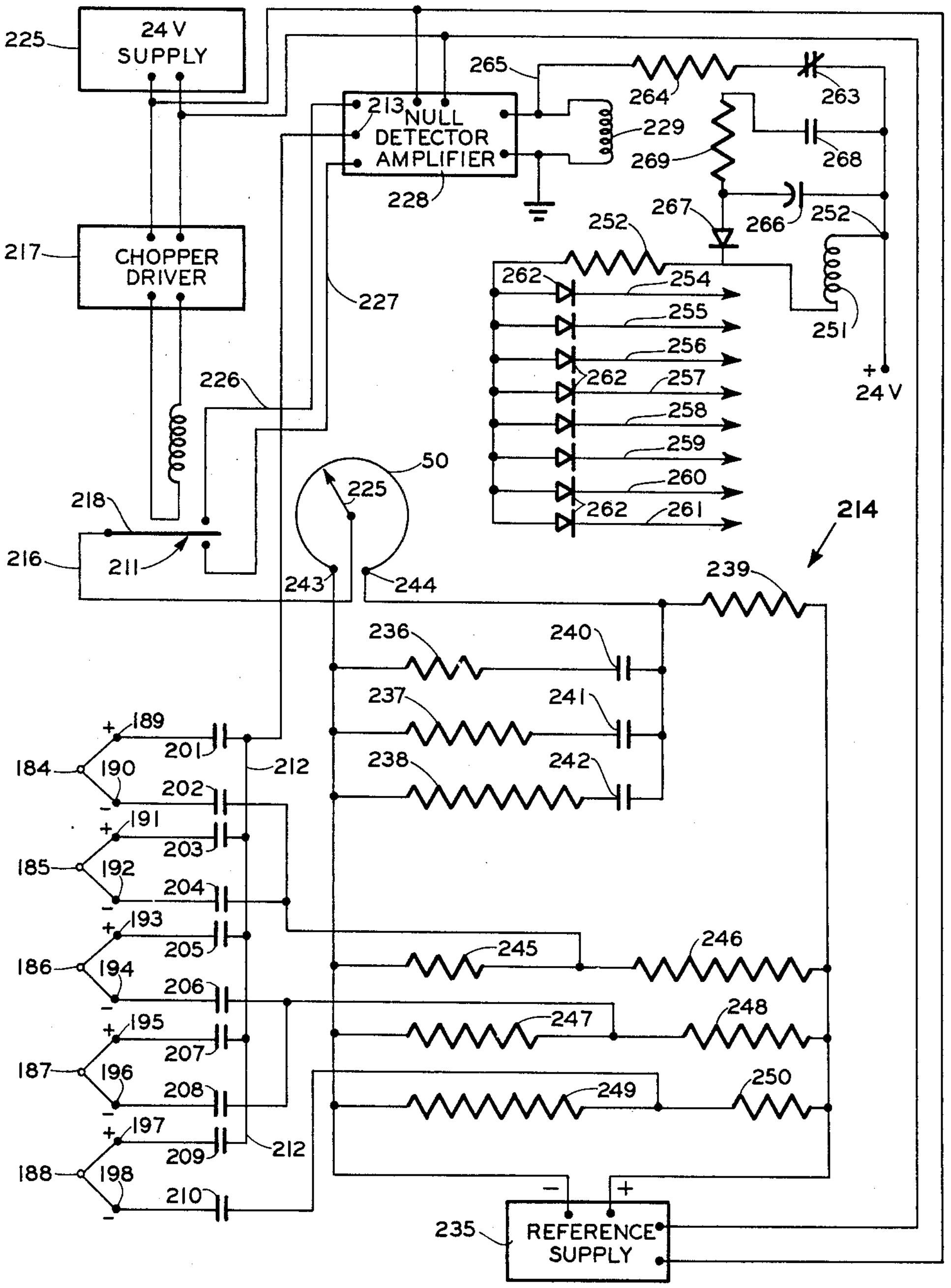
FIG. 23 is a schematic diagram illustrating the measuring circuit of this invention.
Figure 24:
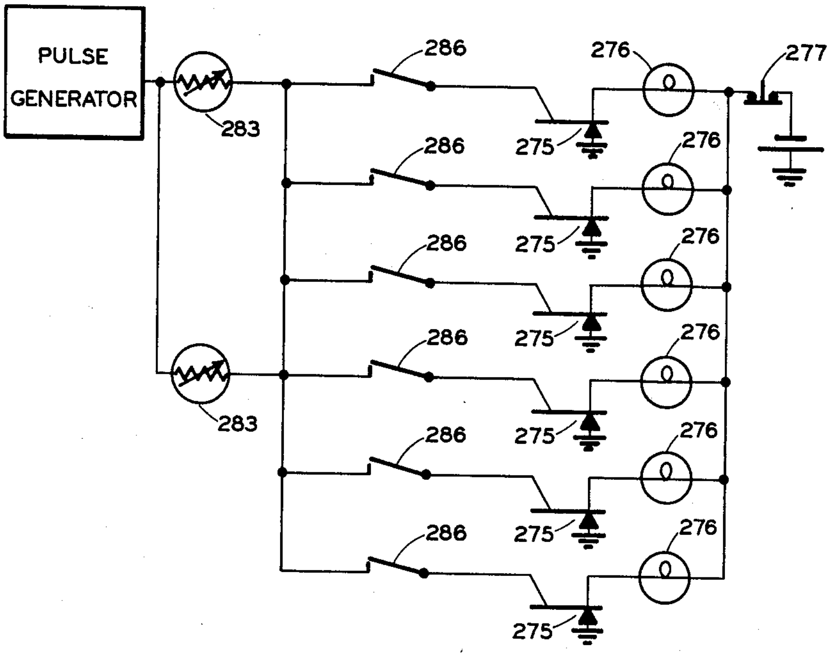
FIG. 24 is a schematic diagram illustrating the alarm circuit of this invention.

The circuitry of the potentiometer bridge according to this invention is shown in FIG. 23. A number of sources 184–188 of signals to be measured are supplied to a plurality of terminals 189–198. Each of the terminals 189–198 is connected to one of the group of switches 201–210. The switches 201–210 are activated automatically by the relays 164 of the signal relay matrix 165 of FIG. 20. Thus, there may be many more signal sources than are shown in FIG. 24. The signal sources 184–188 may supply any direct voltage signal. Many unknowns to be measured furnish a direct voltage signal readily, such as temperatures by means of thermocouples 184–188. Other unknowns can, of course, be transformed into the correct signal with proper transducers.

The unknown signals are switched on, one at a time, by the switches 201–210. One side of the unknown voltage (in the example shown in FIG. 23, the positive side) is supplied to the center top terminal 213 of the input transformer (not shown) of the null detector amplifier 238 by a common lead 212. The other side of the unknown voltage is connected into a bridge circuit 214. The arm 215 of the commutator 50, which corresponds to point 80 of FIG. 10 is connected by means of a conductor 216 to the moving arm 218 of a chopper 211.

The chopper 211 is powered by a 24 volt supply 225 through a chopper-driver 217 providing a frequency preferably of at least about 400 cycles per second. The direct voltage that is supplied to the chopper arm 218 of chopper 211 is changed to a square wave alternating current due to the fact that the chopper arm 218 alternately connects one side of the signal through conductors 226 and 227 to alternate ends of input transformer (not shown) of the null detector amplifier 228. The amplifier 228 amplifies the low level alternating current signal to a magnitude large enough to actuate the print relay 229 connected thereto.

The bridge circuit 214 provides a reference signal against which the unknown signal is compared. When the unknown voltage is equal and opposite to the voltage generated within the bridge 214, the net input to the amplifier 228 is zero, and consequently no output exists and the print relay 229 is deenergized. This is called the null. When there is a difference between the unknown and the bridge voltages, the amplifier 228 has a finite net input and the relay 229 is energized.

A hightly-regulated, very stable voltage is supplied to the bridge 214 by a reference supply 235. The bridge 214 has multiple rangers and uses four of the resistors shown in measuring the unknown signal that is supplied to it at a given time. Resistors 236, 237 and 238 are shunting resistors that can be connected across the commutator 50 and are used in setting the voltage span covered by the commutator 50. One of the resistors 236-238 combined with resistor 239 sets the value of voltage over which the recorder sweeps from start to finish of a chart-frame 14. Switches 240, 241 and 242, which are controlled by the relay matrix 165, are provided for connecting any one or more of the resistors 236–238 into the span arm of the bridge 214, thus providing a plurality of voltage spans selectively available depending upon the unknown to be measured. Seven spans are available with the resistors 236–238 shown in FIG. 23. However, it is apparent that the number of spans can be increased by adding to the number of span resistors and to the number of controls provided by the relay matrix 165. Since many of the unknown signals can use the same voltage span, it is usually not necessary to have as many voltage spans as unknown signals.

Resistors 245–250 make up three zero suppression arms in the bridge 214. The ratio of the resistances 245, 246 allows measured voltage to be suppressed from zero by connecting it through the appropriate switch 202, 204, 206, 208, or 210 to a point at the desired potential in the circuit 214. For example, assuming the measured voltage is in millivolts, the voltage does not necessarily need to go from zero to ten millivolts for full scale on the recorder chart. It could go from minus six to plus 4 or plus 7 to 21 millvolts.

The unknown voltages are supplied one at a time to the suppression arms of the bridge between resistors 245–246, 247–248, or 249–250. Assuming that the commutator arm 215 rotates clockwise the unknown voltage is connected to the bridge 214 when the commutator arm 215 starts at contact 243. The arm 215 continues until the resistance of the commutator 50 balances the bridge 214. At this time the net voltage supplied through conductor 216 to the chopper 217 drops to zero and consequently the voltage supplied to the null detector amplifier 228 drops to zero. The print relay 229 is then de-energized and the printing mechanism 116 places a dot on the chart 13. The commutator arm 215 continues to contact 244 and at this time the unknown voltage being measured is switched off.

As the commutator arm 215 rotates it will pass between the terminals 243 and 244 on the commutator 50. At this time the print-bar 115 will be passing between chart-frames 14—14. There will be no voltage supplied to the chopper 211 from the bridge 214 and, consequently, the amplifier will not supply current to the print relay 229. If no provision were made for this condition the printing mechanism 116 would be activated between chart-frames 14—14. FIG. 23 includes a diagram of the circuit for insuring that the print relay 229 remains energized while the commutator arm 215 passes between the terminals 243 and 244.

One side of a print lock out relay coil 251 is connected to a 24 volt supply at terminal 252. The other side of the print lock out relay 250 is connected through a resistor 253 to a plurality of leads 254–261 connected to the magnetic reed switches 169—169 of the row selector 168. When the switches 169—169 are closed, current flows to energize the print lock out relay 251. A diode 262 is provided in each of the leads 254–261 to prevent reverse current, which would allow more than one horizontal row 167 in the relay matrix 165 to be energized. As the print-bar 115 moves over the chart 13, the magnet 170 passes between the switches 169—169 at the same time that the print-bar 115 passes between the chart-frames 14—14 and at the same time that the commutator arm 215 passes between the terminal 243 and 244. When the magnet 170 is between the switches 169—169, there is no current through any of the leads 254–261 and the print lock out relay 251 is de-energized. De-energizing the relay 251 closes the switch 263 supplying current through resistor 264 through the conductor 265, which is connected to the print relay 229, as shown in FIG. 23. Thus, the print relay 229 is kept energized during the particular time when it receives no current from the amplifier 228 because of the commutator arm 215 being between terminals 243 and 244. When one of the switches 169—169 is again closed, the current is again supplied to the print lock out relay 251, while the commutator arm 215 has completed its travel between terminals 243 and 244. For proper timing, however, it is preferred to have the print lock out relay 251 energized slowly and thus open switch 263 with some slight delay. The capacitor 266 and diode 267 aid in accomplishing this delay. When the circuit to the print lock out relay 251 is re-established, the capacitor is charged first, delaying the activation of the relay 251. However, the diode 267 prevents discharging of the capacitor 266 through the relay 251 which would delay the drop out. Energizing the relay 251 closes the switch 268, causing the capacitor 266 to discharge through the resistor 269. The effect of the diode 267, capacitor 266, switch 268 and resistor 269 is to make a slow energize, fast de-energize relay out of relay 251.

In the sweep balance recorder the print-bar 115 is driven at more or less the same constant speed across the chart 13. Synchronized with the motion of the print-bar 115 is the voltage divider 50 which generates a known reference voltage at each incremental position across its span. At the instant the reference voltage is precisely equal to an unknown voltage to be recorded, an electric pulse is generated which causes the printing mechanism 116 to print a dot on a chart-frame 14. The position of the dot on the chart-frame 14 represents the measured variable at that instant.

In some cases it is desirable to establish preset alarm levels which will indicate by audible alarm, flashing light, or other means the fact that a measured variable has gone outside normal limits. This invention describes a means by which a simple alarm circuit utilizing all solid state components without moving parts of any kind can be added to a sweep balance recorder. In addition, it is conceivable that the alarm might be used in some applications where a permanent record is not required nor desired. Hence the alarm system can be divorced from recording, although a sweep balance voltage divider is still required.

The electric pulse which causes the printing mechanism 116 to print the dot described in the preceding paragraph is used in this system to set off an alarm if it occurred at such a time as to represent the measured variable outside the normal range. Referring to FIG. 24, a circuit element utilized for the alarm system is a silicon controlled rectifier 275. This is a semi-conductor device which has many of the characteristics of a thyratron; that is it has three elements, analogous to the anode, cathode, and grid or "trigger." The impedance between anode and cathode is very high, essentially infinite, until an external voltage pulse is applied to its "trigger." At this time the anode to cathode impedance drops to a very low level, essentially a short circuit so that an alarm 276 is energized. The device remains in this broken down condition even after the external pulse has gone away, so long as load current is passed through the device. When the anode to cathode current is interrupted, however, the device instantaneously resets itself to the infinite impedance condition. In this invention a separate silicon controlled rectifier 275 is provided for each measured variable on which an alarm circuit is to be applied. The silicon controlled rectifier 275 acts as a switch which turns on the alarm 276 when an off-normal condition exists. The alarm 276 stays on until it is reset externally, usually by a manual pushbutton connected to a normally closed reset switch 227 indicating that an operator's attention has been drawn to the abnormal condition.

The operating parameters of the common silicon controlled rectifiers are such that the same voltage pulse which is used to operate the printing mechanism 116, commonly 24 volts D.C., can be used directly to fire the "trigger" of the silicon controlled rectifier 275. All that is required, then, is a gating circuit which allows the printing pulse to reach the trigger if the pulse occurs on a portion of a chart-frame 14 representing an off normal measurement, but preventing it from reaching the trigger if the variable appears in the normal range. Obviously this gating circuit could be a device like a cam and cam-follower operating a switch. In such a case the cam would be synchronized with the sweep of the voltage divider and a "valley" would be milled onto the cam in a portion of the periphery representing the "alarm zone" of the measured variable in question. If the switch were of normally open operation, it would be inserted in the lead carrying the print pulse and connected to the trigger of the silicon controlled rectifier 275. Then if the print pulse occurred when the cam follower was on the "valley," the pulse would set off the alarm 276; if on the other hand it occurred when the cam follower was on a position indicating the "normal" range of the variable, the switch would represent an open circuit and the alarm 276 would not be set off.

Figure 25:
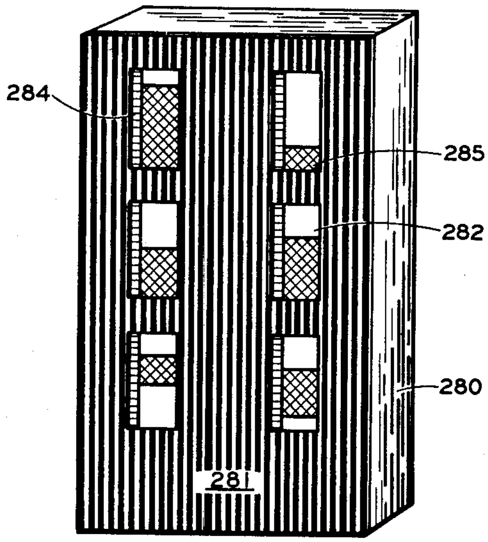
FIG. 25 is a perspective view of a light box used in the alarm system.

In order to eliminate the moving parts and inconvenience of setting a mechanical cam and cam follower, this invention has utilized an optical "gate" controlled by the presence or absence of light. A "light box" 280 (FIG. 9 and FIG. 25) is provided with a mask 281 allowing a narrow light slit 282 analogous in extent to the ordinate of each measured variable in the sweep balance recorder. A photosensitive resistor 283, such as a cadmium selenide crystal is mounted in such a way that it sweeps along this light slit 282 synchronized with the sweep of the voltage divider in the measuring circuit. The light slits 282 correspond in length to the height of a chart-frame 14 and are calibrated with markings 284 that correspond to divisions on the chart-frames 14—14. Any desired portion of the slit in the mask over the light box can be further masked or blocked off by such means of a piece of pressure sensitive opaque tape 285, or in other ways. Thus as the photosensitive resistor 282 sweeps along the slit, it is alternately exposed to bright light and darkness depending on the position of the masking tape 285. The characteristics of a photosensitive resistor 283 are somewhat analogous to a switch in that its internal impedance is very high when dark, but very low when exposed to a bright light. Hence the operation of the photosensitive resistor is somewhat similar to the operation of the hypothetical cam, cam follower, and switch in the preceding paragraph. The position of the masking tape 285 is analogous to the position of the "valley" on the cam and the resistance of the photosensitive resistor 283 varies from high to low as it passes over the light and dark portions. The photosensitive resistor 283 is simply wired in series between the pulse generator and the trigger of the silicon controlled rectifier 275 and performs the gating function required.

Since sweep balance recorders are generally used to record a number of variables, there must be a separate alarm circuit including a silicon controlled rectifier 275 and light slit 282 for each point. The photosensitive resistor 283, however, will generally be time shared among all of the points being recorded in one vertical column 102 of the chart-frames 14—14. Most conveniently the photosensitive resistor 283 will be mounted on a bracket rigidly attached to the print bar in the recorder. The light slits will be lined up, one above the other, in positions exactly analogous to the chart-frames in a vertical column. The same relay matrix 165 which switches one measured variable at a time into the sweep balance measuring circuit is provided with another set of contacts 286 to switch the photosensitive resistor 283 onto the trigger of each respective silicon controlled rectifier 275 in sequence as the recorder scans the successive points.

PRODUCTION RECORDING SYSTEM

The production recording system of this invention has many advantageous features. For example:

It records:

(a) *Production.*—The chart shows, minute-by-minute throughout the day, the total amount produced by each of any number of machines. At the same time, it shows the rate at which the machine has produced at each instant through the day, in relation to what is normal for that machine.

(b) *Downtime.*—It shows in a unique way the amount of time each machine has been down, and the reason why.

Amount of downtime: A graphic record is made of all downtime for each machine, showing when it occurs.

Cause of downtime: The reason for downtime is recorded and displayed for each machine.

Totalized downtime: The total number of machine-minutes lost for each of six categories of causes is shown on six separate digital counters.

It computes. Without any additional equipment, it performs arithmetic operations, such as:

(a) Addition: The output of each machine can be recorded in separate graphs, then the total of all machines can be added together and recorded in another graph.

(b) Subtraction: The rejects can be separately counted and subtracted from the total production of each machine. The graph then shows the record of good production.

(c) Multiplication: In the manufacture of sheet material, it can multiply the thickness (or basis weight) times the width times the footage produced to record tonnage directly.

(d) Division: The output of one machine can be expressed and recorded as a ratio of the output of another machine, or group of machines.

It displays:

(a) *Chart.*—The record is always visible and accessible. Since it is actually a set of graphs, the chart itself is used as a worksheet or logsheet by production control personnel or supervisors.

(b) *Alarms.*—The cabinet has internal lights behind the chart which show through the paper. The chart paper itself lights up red when any machine is down.

It is versatile. Since the input to the system is simply a pulse for each unit produced, simple limit switches, footage counters, flowmeters, or any of hundreds of different types of sensors can be provided to record gases, liquids, or solids; individual pieces, continuous sheets, or liquid streams, rates from 1200 pieces per minute or more down to one per hour or less.

It produces quick returns. Specific causes of downtime are usually cut in half, sometimes practically eliminated, by the rapid, easily understandable transmittal of information to all concerned.

It creates a good psychological atmosphere. The records are out in the open for all to see, nothing is hidden. It instills a pride of accomplishment, a healthy rivalry and spirit of competition between crews.

It is economical to install. Only low-voltage wiring is required. Intercom and telephone wiring practices apply.

*Typical specifications*

Figure 26:
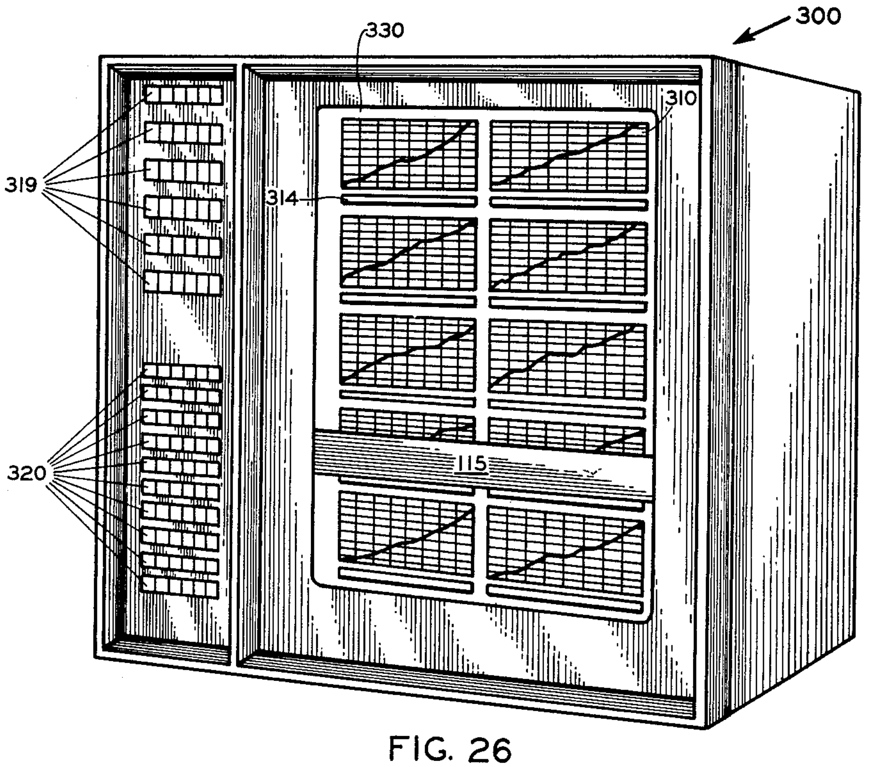
FIG. 26 is a perspective view of a recorder, downtime totalizer, and digital production totalizer of a typical production recording system according to the present invention.

(a) Recorder 300 (FIG. 26)

Capacity:
  10 or 16 chart frames (2 columns wide by 5 or 8 frames high),
Dimensions:
  10 frame—36" H. x 22" W. x 18" D.
  16 frame—50" H. x 22" W. x 18" D.
Power:
  115 v., 60 cy., 3 amp.
Circuitry:
  All solid-state, or electromechanical.
  No vacuum tubes or complex electronics.
Signal inputs:
  Low voltage, resistance bridges.
Recording rate:
  Once per minute standard. Higher rates also available.

Figure 27:
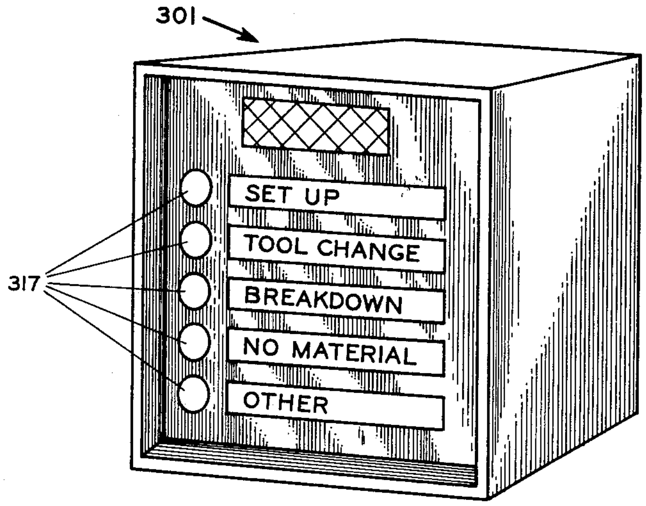
FIG. 27 is a perspective view of a typical operator's control station containing a machine accumulator used in the typical production recording system.

(b) Machine accumulator and operator's control station 301 (FIG. 27)

Required:
  One per machine.
Functions:
  (1) Totalizes pulses throughout the day.
  (2) Alarm light indicates machine downtime.
  (3) Operator diagnoses trouble by push-button.
Dimensions:
  6" H. x 6" W. x 4" D.
Input:
  One 24 v. D.C. pulse per unit of production.
Output:
  Electrical resistance (3 wire bridge) to recorder.
Capacity:
  One pulse per hour to 1200 per minute.
Zero reset:
  All accumulators simultaneously reset from lock-switch inside recorder cabinet.

*Recording by the "ramp chart" method*

Figure 28:
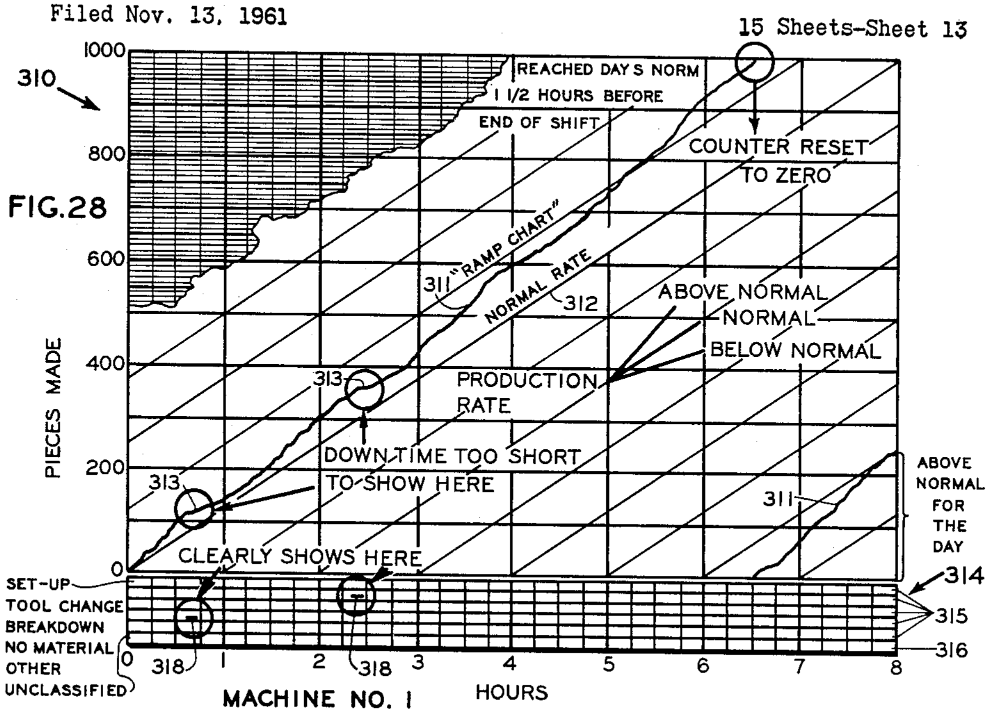
FIG. 28 is a normal view of a typical ramp chart and downtime graph, showing an example of the records provided thereon.
Figure 29:
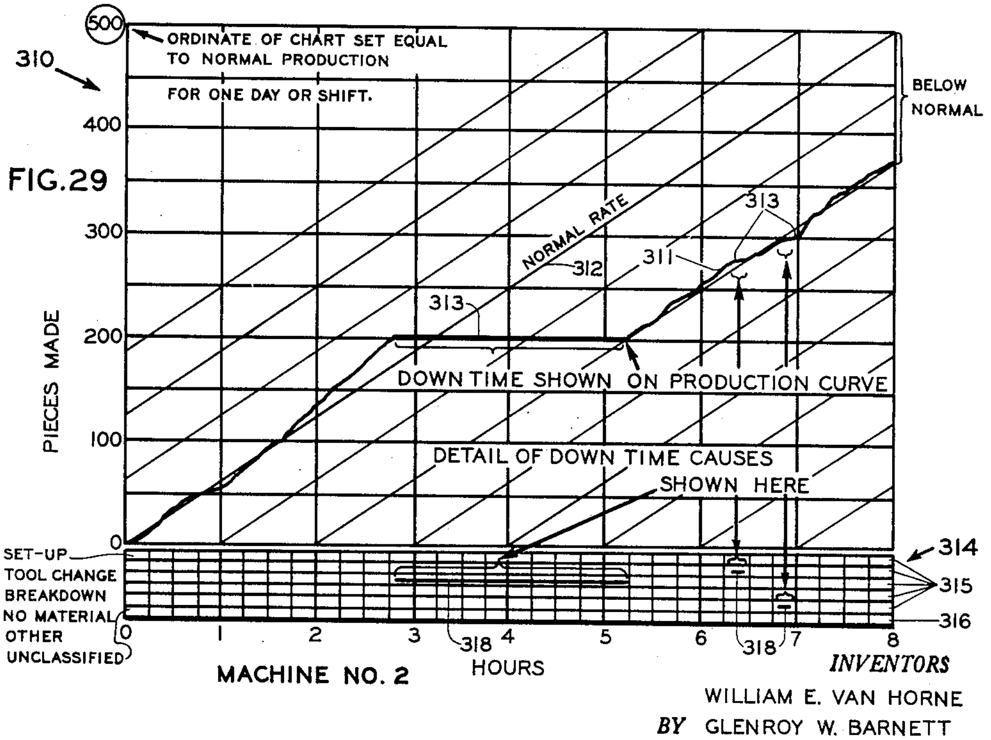
FIG. 29 is a view similar to FIG. 28, showing another similar example.

The system records production by the "ramp chart" method, which shows a uniquely simple, accurate, and understandable picture of the entire operation. (FIGS. 28 and 29.) On a "ramp chart" 310 a record 311 is made, minute-by-minute, of the total amount produced since the beginning of the shift or day. This record starts at zero at the beginning of the day and climbs as production proceeds. The vertical scale on the graph 310 is set equal to the number of pieces expected from that machine for the day. Hence, if a machine is producing at exactly its normal rate, the record will follow a diagonal line 312 starting at zero and just reaching the top of the graph at the end of the day (the upper right corner). The slope of the production curve 311, then, shows the rate at any instant; a slope steeper than the "normal" indicates a rate greater than that expected, a flatter curve indicates the opposite.

*Downtime accounting*

On the ramp chart 310, downtime is indicated by a horizontal portion 313 of the production record, i.e., no increase in the total for some period of time. A second graph 314 is provided immediately under the ramp chart graph 310, to record more precisely the exact amount of downtime on each machine as well as the reason for the downtime.

The downtime graph 314 is very similar to a musical staff except that it has six, rather than four, spaces. Each of the upper five spaces 315 is labelled with one of the common categories of downtime causes. The bottom space 316 is labelled "unclassified." A five-position push-button station 301, FIG. 27, is mounted at each machine. When the machine is shut down, the operator is asked to push one of the five buttons 317 identifying the cause. Where one or more of the causes can be instrumented so as to register automatically, such as when a hopper runs dry, it is not necessary for the operator to push the button for that cause. In the case of either manual or automatic cause identification, a straight line 318 is plotted in the appropriate space in the downtime graph 314 identical to the flat portion 313 of the ramp chart record 311. If the operator fails to identify a cause, the downtime is recorded in the "unclassified " space 316. In this way not only is the cause of the major downtime identified, but also downtime periods too short to be clearly noticed on the ramp chart 310 are prominently recorded and displayed.

*Totalizing downtime causes*

Six digital counters 319 may be provided to totalize the amount of downtime for each of the six causes on all machines. Hence, if ten machines are down for one minute for one cause, the appropriate counter registers ten machine-minutes. At the end of the day an unquestionable record of lost time in the entire operation is provided.

*Digital production count*

It is often necessary to count total production for accounting purposes to a precision of five or six digits. At the same time, the accountant is less concerned with the minute-by-minute record of the rate of production which is so important to the production supervisor. For accounting, a six-digit decimal counter is ideal. Six digit drum counters 320 repeat the total counts from the ramp charts. Hence the system supplies both types of production counting required, the accounting type of total, and the supervisory type.

The production recording system of this invention provides a foreman or production supervisor with a continuous status report, in the form of running graphs, on each of the machines or operations in his department or plant. It is important for the supervisor to know essentially five pieces of information about each of his machines, and these are the factors that the recorder 300 shows:

A. The *total* number of pieces (or gallons, pounds, square yards, etc.) made since the beginning of the shift or day.

B. The *rate* at which they have been made, minute-by-minute throughout the day.

C. If any downtime has occured on any machine, *when* it happened.

D. *How long* the downtime lasted.

E. What *caused* the downtime.

Referring to FIG. 26, the production recorder 300 shows the required information in an easily readable form by means of running graphs for each machine. The recorder 300 contains a chart 330 that has been preprinted with two graphs 310, 314 for each of ten machines. The first of these graphs (310, FIGS. 28, 29) is 4 inches by 6 inches, the horizontal dimension divided into hours, and the vertical dimension into production piece count. On this graph 310 the system records a ramp chart record 311 showing the first two pieces of information required, the production total and also the production rate. Immediately underneath each ramp chart 310 is a small bar graph 314, similar to a musical staff, which is used to show the details of downtime. The bar graph 314 is 6 inches long and ⅝ of an inch high, divided into 6 spaces. The first five of these spaces 315 are assigned typical categories of downtime causes, such as "set-up time," "breakdown," etc. The sixth space 316 is labeled "unclassified." Any time the machine stops producing, the system records a line or bar 318 in one of these six spaces 315, 316. The machine operator is provided with a push-button station 301 (FIG. 27) which allows him to enter information on what is causing the outage. If none of the buttons 317 is pushed, the downtime bar 318 is recorded in the sixth, "unclassified" space 316.

The system comprises a sweep balance recorder 300 which periodically samples each of a number of channels of input data and prints a dot on the chart 310 representing the value of that input at that instant. In this case the input data is an electrical resistance; the total resistance that has been accumulated in a potentiometer-type accumulator 332 that is driven a step at a time each time a piece is made on a machine. A separate accumulator 332 is provided for each machine, mounted in the same box with the push button station 301 for indicating downtime causes. The accumulator 332 is a ratchet device actuated in small equal steps by a solenoid which drives a potentiometer 333 through a worm gear. It is calibrated and set so that a normal day's production just drives the potentiometer 333 one complete revolution. Since the recorder plots the accumulated resistance periodically, a normal day's production appears as a diagonal line, or "ramp" 312, starting at zero at the beignning of the day and ending at the top of the chart at the end of the day. Faster or slower than normal production is shown on the chart as a deviation from this slope.

Figure 30:
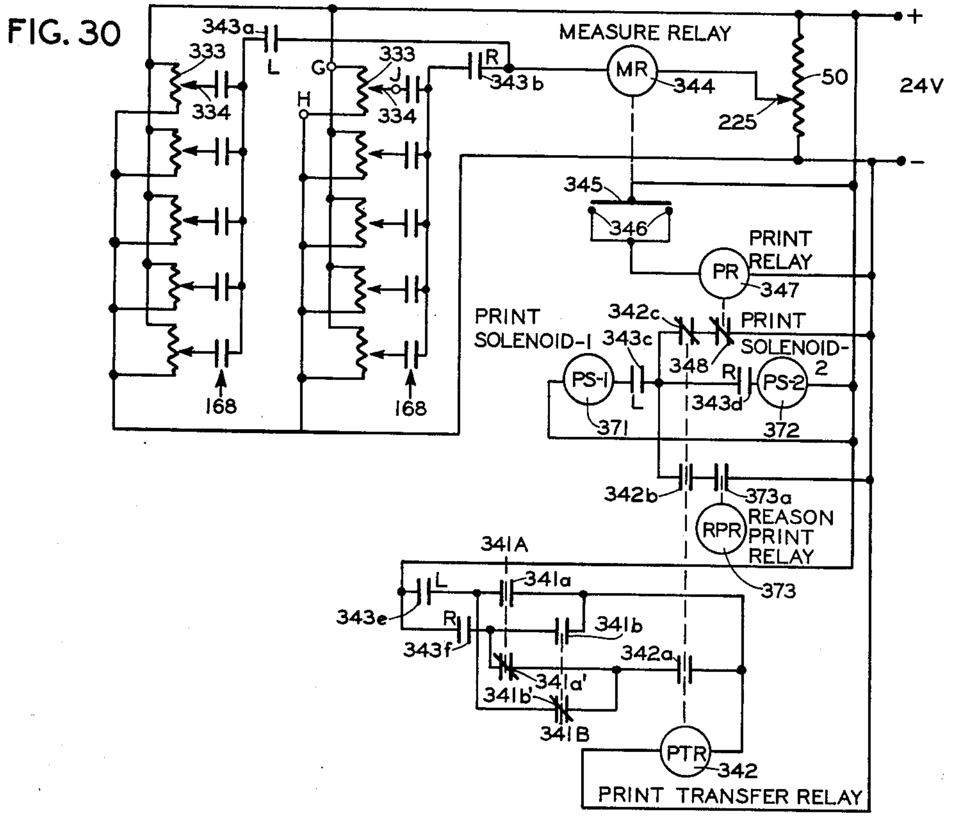
FIG. 30 is a schematic diagram of typical circuitry in a portion of the production recording system.

It is the sweep balance principal that makes it possible for the system to record electrical resistance. Mounted on the main drive shaft 157 (FIG. 9) of the recorder 300 is a variable resistance 50. As the main drive shaft 157 revolves, a printing bar 115 is made to move across the face of the recording chart 330 and, synchronized with it, a slider or brush 225 sweeps around the variable resistance 50. Hence, there is a point on the circumference of the variable resistance 50 which corresponds precisely to each point of the vertical scale of the graph 310. The potentiometer 333 in the production accumulator 332 and the variable resistance 50 inside the recorder 300 are connected as a Wheatstone bridge (FIG. 30). As the recorder sweeps through its range, at the precise instant that the two resistances are equal, the printer 116 prints a dot on the chart 310. This dot, then, appears on the graph 310 at a position representing the resistance of the accumulator potentiometer 333 at that moment. Since the printers 116 are slowly driven to the right with time, the dots form a continuous line as the day progresses.

The recorder 300 is used to record on ten ramp charts 310, as described. On the master chart 330 there are five ramp charts 310 lined in a column vertically, and there are two columns of charts 310, side by side. The main drive shaft 157 makes one complete revolution as the printing bar 115 passes over each chart 310 vertically. As it sweeps over each chart 310, a switching network cuts in the appropriate machine accumulator 332. Inside the print-bar 115 of the recorder 300 there are two printing devices 116, one for the left and one for the right column. Once each minute the print-bar 115 sweeps from bottom to top, and the left printer 116 prints a dot in each of the graphs 310 in its column. Then the print-bar 115 reverses and on the downward sweep the right printer 116 prints a dot in each of the graphs 310 in its column.

The device 340 (FIG. 31) which causes the downtime bar graph records 318 to be printed is different from the sweep balance Wheatstone bridge circuit. A set of cam actuated switches 341 are provided, also on the main drive shaft 157, to cause the dots to print when required on the bar graphs 314 between the ramp charts 310.

The main drive shaft 157 is driven by a capacitor-run motor 158 with integral worm gear reduction. The motor 158 drives at practically constant speed as the print-bar 115 passes over the charts 310, 314, and the motor 158 need not rapidly accelerate, decelerate, or reverse at the time of printing.

The commutator voltage divider 50 is mounted coaxially around the drive shaft 157. The brush arm 225 of the commutator is pinned to the drive shaft 157 so that slippage is impossible. Hence, there is a precise position of the brush arm 225 on the commutator 50 for every position of the drive shaft 157, and in turn for every position of the print-bar 115 in its sweep over the charts 310, 314. The sprocket and chain ratio is such that the drive shaft 157 makes precisely one revolution as the print-bar 115 moves over the distance from the top of one chart 310 to the top of the next. Hence, there is one point on the periphery of the commutator 50 corresponding precisely to each point across each chart-frame 310.

Alongside the commutator 50 is a set of switches 341, 341A, 341B (FIGS. 30, 31, 32) actuated by cams (not shown). There are eight cams and a switch 341, A, B, for each cam. The two outer switches 341A, 341B are used in conjunction with the print transfer relay 342. The six inner switches 341 generate pulses for printing the six downtime reasons.

In the production recorder 300 the number of pieces made is accumulated on the precision wirewound potentiometers 333 with the arm 334 on each potentiometer 333 being moved around as more pieces are made on the machine whose output is being recorded. At all times the accumulator potentiometers 333 have the same fixed voltage applied across them that is applied across the precision potentiometer (commutator) 50. When a particular accumulator 333 is to be measured, the center arm 334 of that potentiometer 333 is switched into the measuring circuit. Two devices must be actuated in order for an accumulator potentiometer 333 to be connected into the measuring circuit. The vertical column on the left is recorded while the print-bar 115 travels up and the right hand column is recorded while the print-bar 115 travels downward. The up and down relays 343 control the contacts 343*a*, 343*b* to select whether the left or right hand accumulator potentiometers 333 are to be measured. It is now necessary to determine which specific potentiometer 333 should be connected into the measuring circuit based on the vertical position of the print-bar at any particular time. This is accomplished by the reed capsules 168 (FIG. 9) which are arranged vertically in the recorder cabinet. The reeds 168 are normally open switches which are closed in the presence of a permanent magnet. A permanent magnet 170 approximately the length of a pair of charts 310, 314 is fastened to the traversing casting which carries the print-bar 115 up and down. The magnet 170 is held near to the reed capsules 168 so that it closes pairs of contacts in one reed capsule 168 while the print-bar 115 is over the charts 310, 314 associated with the accumulator potentiometer 333 connected to the reed capsule 168. Thus is selected the particular charts 310, 314 by the reed switch 168; and the column in which printing is to take place is selected by the contacts 343*a*, 343*b* on the up and down relays 343. This means that in the ten charts 310 to be measured there is one unique set of contact closures for each variable.

When the proper contacts 168, 343 are closed (see FIG. 30), the arm of 334 of the accumulator potentiometer 333 is connected to the null sensing device, which is a polarized relay 344. The relay 344 is called the measure relay. When the voltage between the precision commutator arm 225 and the accumulator potentiometer arm 334 is different from zero, the magnetized contact arm 345 is held against one of the two contacts 346, depending upon the polarity of the voltage difference. At the instant during the scanning by the commutator arm 225 when the voltage difference becomes zero, the polarized relay 344 is de-energized, and the contact arm 345 is released to its midposition shown in FIG. 30, breaking the circuit to the print relay 347. At this time the print relay 347 is de-energized and printing is actuated by the normally closed contact 348. When the system is off balance the measure relay 344 is energized, as is the print relay 347, and printing does not take place. Therefore, printing takes place only when the bridge is balanced. At this time a point is printed on the chart 310 and the print-bar 115 moves on through that chart 310 and into the next, at which time the next accumulator potentiometer 333 is connected in the circuit and the cycle repeats.

When a downtime occurs it is indicated on the chart 314 between the ramp chart graphs 310 on a special set of spaces 315, 316. The downtime print signal is generated by the six cams on the main drive shaft 157 of the recorder 300. The cams strike the six individual precision switches 341, once each revolution. The positions of the cams and of the switches 341 are set to coincide with the positions of the print-bar 115 over the respective bars 314, 315 provided between the charts 310. The striking of the switch 341 by a cam does not cause printing automatically. In each operator's station 301, there is a timer circuit which must time out and pick up a relay 349 called the downtime relay before printing can take place through the downtime print contact 349*d* (see FIGS. 31 and 32). If the operator has taken no action to acknowledge this downtime, the unclassified reason 316 prints as the cause for downtime. In each operator's station are five buttons 317, each of which is assigned a different cause of downtime. If the operator pushes any one of these buttons 317 it takes the downtime printing away from the unclassified reason 316 and makes it print in the bar 315 assigned to the button 317 which the operator pressed.

In much the same manner as the sequencing of the measure circuit, it is necessary to use up and down relay contacts 343 and reed capsules 168 to select in which column and on which chart 314 the downtime reasons are printed. Thus, for each chart in the recorder 300 there are two reeds 168, a reason reed 168 and a measure reed 168A. While there are only six downtime reasons there are actually eight cams and eight precision switches 341, A, B, in the recorder 300. The first and last of the switches 341A and 341B are used to disconnect the measuring circuit and connect the reason printing circuit at the proper time. This is accomplished through the two cams and switches 341A, 341B and the print transfer relay 342 which serves the function of turning off the measuring circuit and turning on the reason printing circuit; and before the next measurement is started, turning the measuring system back on and turning off the reason print circuit.

Figure 32:
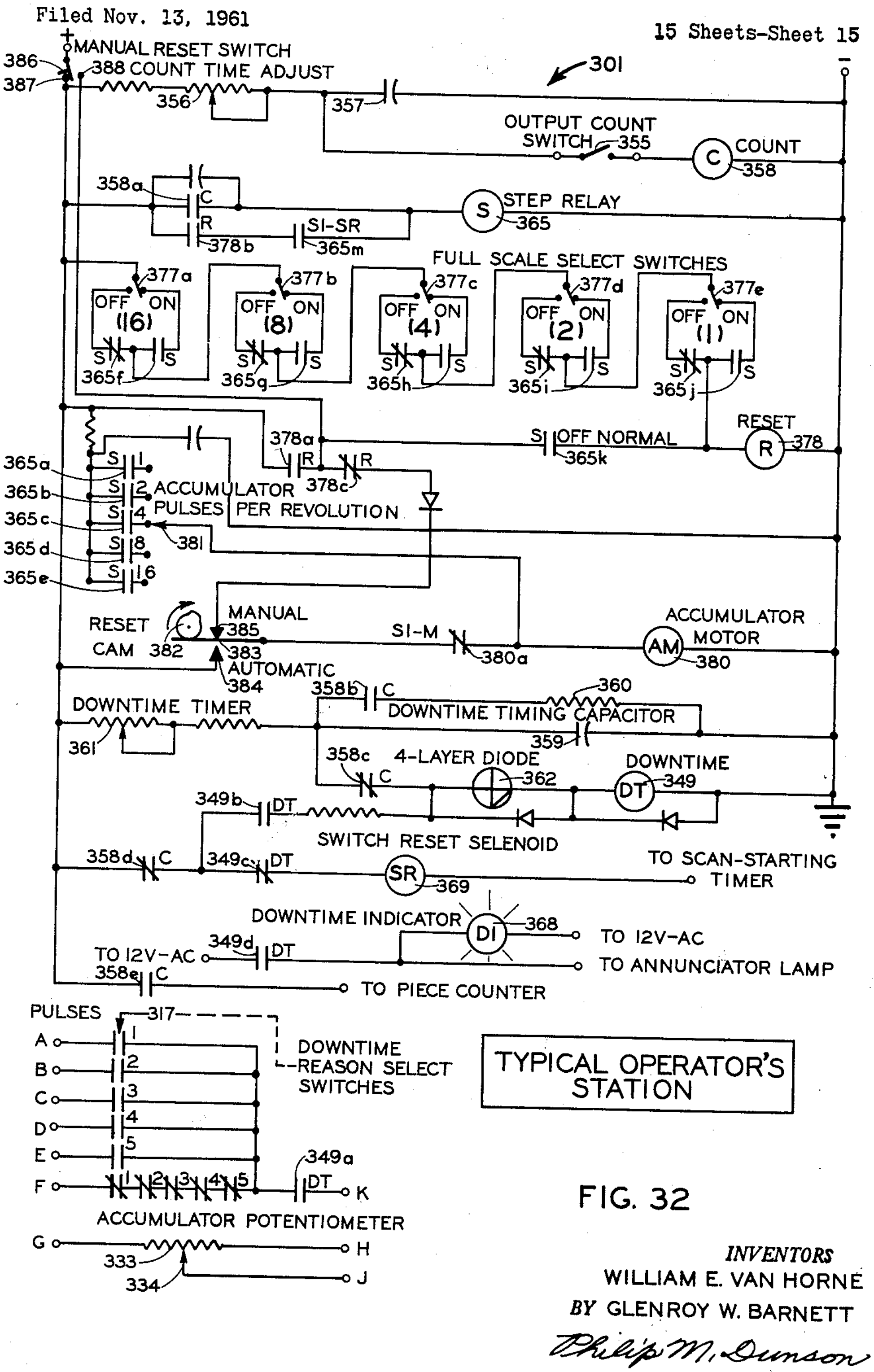
FIG. 32 is a schematic circuit diagram of a typical operator's station.

At each machine where parts are being counted there is an operator station 301, FIG. 32. From earlier discussion it is seen that two of the items this unit contains are the accumulator potentiometer 333 and the downtime reason switches 317. A unique set of switching equipment is used in this station in order to drive the accumulator potentiometer 333. Two terminals are provided which connect to the output count switch 355. This is a device which closes every time a piece is made. There is associated with this a count time adjustment potentiometer 356 and a count time capacitor 357. The purpose of these devices is to keep the system from counting more often than the machine is capable of producing parts, thus preventing false counts. The setting on the count time adjust potentiometer 356 is such that if the normal production rate is one per minute, the system will accept a count no oftener than each 45 seconds. The adjustment is set proportionately faster or slower for other normal production rates.

When the count time capacitor 357 has charged up sufficiently and the output count switch 355 is closed, the count relay 358 is energized. This relay 358 has several contacts 358*a–e*. One contact, 358*b*, resets the downtime timing system so that if the machine does not indicate downtime it must start timing all over again. If downtime has been indicated, when the count relay 358 is energized, it turns off this downtime indication by discharging the timing capacitor 359 through the resistor 360. (A downtime timer adjustment potentiometer 361 sets the time constant of the circuit to control the time necessary for the capacitor 360 to charge to a voltage sufficient to breakdown the resistance of the 4-layer diode 362 and energize the downtime relay 349 through the contact 358*c*.) At the same time the step relay 365 is advanced one step by completion of the circuit through the contact 358*a*.

The step relay 365 is a complex electro-mechanical relay (but now known widely enough that it can be considered as conventional in its general type of construction) which when pulsed advances one step. A full revolution of this relay 365 requires thirty-two steps.

There are six cams on the step relay 365. Five of the cams actuate switches which have one form A contact 365*a–e* (normally open) and one form C contact pair 365*f–j* (one normally closed, the other normally open). The sixth switch has a single form A contact 365*k*.

The six cams are each notched differently. The first cam has sixteen hills and sixteen valleys, all equal in width. The next cam has eight hills and eight valleys, each twice as wide as the hills and valleys on the first cam. The third cam has four hills and four valleys, each four times as wide as those on the first cam. The fourth has two hills and two valleys, each eight times as wide as those on the first cam. The fifth has one hill and one valley, each sixteen times as wide as those on the first cam. The sixth cam has one hill and one valley with the hill having the same width as a hill on the first cam, and with the valley width 31 times the width of the hill.

With the cams cut as described above, the switches actuated by the first cam alternately opens and closes with each step of the step relay. The second switch is open for two pulses and closed for two. The third switch is open for four pulses and closed for four pulses, the fourth switch is open for eight pulses and closed for eight pulses, while the fifth switch is open for sixteen pulses and closed for sixteen pulses. Thus, for each of the thirty-two steps of the step relay there is a unique set of contact positions describing that step.

Connected across each form C contact pair 365*f–j* of the step relay 365 there is a single-pole double-throw switch 377*a–e* called a full scale select switch. There are five of these switches, one for each of the first five cam switches. The step relay contacts 365*f–j* are shown in the "home" or "zero" position, and the switches 377*d–e* are shown in the "on" position. There is no electrical circuit through the reset relay 378. In order to provide such a circuit, all of the step relay contacts 365 *f–j* must reverse their positions. It requires thirty-one steps of the step relay 365 to accomplish this.

The contact pair 365*f* is actuated by the fifth cam, which has only one very wide hill and one very wide valley. Sixteen pulses are required to reverse the contact pair 365*f*. Thus, the setting of the full scale select switch 377*a*, associated with the contact pair 365*f*, determines whether at least sixteen pulses are required to complete a circuit to the reset relay 378. The contact pair 365*g* is actuated by the fourth cam, which has two hills and two valleys. It is reversed every eight pulses. Thus, the setting of the full scale select switch 377*b*, associated with the contact pair 365*g* determines whether at least eight pulses are required to complete a circuit to the reset relay 378, if the select switch 377*a* is in the "off" position (or whether at least twenty-four pulses are required if the select switch 377*a* is in the "on" position). Similarly the select switch 377*c* determines whether four more pulses are needed, the select switch 377*d* determines whether two further pulses are needed, and the select switch 377*e* determines whether the total number of pulses to complete a circuit through the switches 377*a–e* and the step relay contacts 365*f–j* is even or odd. For any combination of positions of the full scale select switches 377*a–e*, the sum of the numbers in parentheses (16, 8, 4, 2, 1) in FIG. 32 immediately below the respective switches 377*d–e* that are in the "on" position indicates the number of pulses needed to complete the circuit to the reset relay 378. For example, if the select switches 377*a*, 377*c*, and 377*d* are in the "on" position, and the switches 377*b* and 377*e* are in the "off" position, the number of pulses needed to complete the circuit is 16 plus 4 plus 2, a total of 22.

When a circuit is closed through the switches 377*a–e* and the contacts 365*f–j*, the reset relay 378 is pulled in. The reset relay 378 is held in through one of its own normally open contacts 378*a* and the "off normal" or homing contact 365*k* on the sixth cam of the step relay 365. The reset relay 378 closes its contact 378*b*, causing the step relay 365 to step through its self-interrupt contact 365*m* (roughly similar to a buzzer or doorbell) until the contact 365*k* opens, dropping the reset relay 378, and the step relay 365 is now home.

With this circuit, after some preset number of input pulses from 1 to 31, the step relay 365 homes. As the step relay 365 rotates it also closes the form A contacts 365*a–e*. The contacts 365*a–e* cause the accumulator motor 380 to drive the accumulator potentiometer arm 334 through a worm gear reduction. By choosing which switch 365*a–e* drives the accumulator motor 380, either one, two, four, eight, or sixteen steps can be taken by the accumulator arm 334 per revolution of the step relay 365. The choice is made by setting the accumulator-pulses-per-revolution switch 381 to connect to the desired one of the contacts 365*a–e*, the respective number of pulses obtained being indicated by the number beside each switch 365*a–e* in FIG. 32.

Let us assume that it requires 500 steps of the accumulator motor 380 to provide a full scale mark on the chart 310. If we take one step on the accumulator motor 380 per revolution of the step relay 365 it requires 500 revolutions of the step relay 365 to reach full scale. If we set the full scale select switches 377*a–e* so that twenty steps are taken before reset, then twenty input pulses cause one revolution of the step relay 365 and full scale requires 500 times 20 or 10,000 input pulses. By setting the full scale select switches 377*a–e* to 21, full scale is 10,500, etc.

The chart below shows the full scales available using various typical adjustments.

When the accumulator arm 334 reaches the full-scale position, the reset cam 382, which is mounted on the same shaft, presses the contact arm 383 from its normally up position, as shown in FIG. 32, to its down position connecting to the "automatic" contact 384. This action completes the circuit to the accumulator motor 380 through its self-interrupt contact 380*a*, stepping the accumulator arm 334 to its home position, corresponding to "zero" on the chart 310. At this position the reset cam 382 releases the contact arm 383 to its up position connecting to the "manual" contact 385, where it remains until the accumulator arm 334 again reaches the full-scale position.

AVAILABLE FULL SCALE SPANS

[Input pulses (part count) for full scale]

| Steps Per Revolution Setting | Gear Ratio | Total count on full scale select switches obtained by adding the value of all switches set on On—do not use below a total of 12 | | | | | | | | | |
|---|---|---|---|---|---|---|---|---|---|---|---|
| | | 12 | 13 | 14 | 15 | 16 | 17 | 18 | 19 | 20 | 21 |
| 1 | 20 to 1 | 6,000 | 6,500 | 7,000 | 7,500 | 8,000 | 8,500 | 9,000 | 9,500 | 10,000 | 10,500 |
| 2 | 20 to 1 | 3,000 | 3,250 | 3,500 | 3,750 | 4,000 | 4,250 | 4,500 | 4,750 | 5,000 | 5,250 |
| 4 | 20 to 1 | 1,500 | 1,625 | 1,750 | 1,875 | 2,000 | 2,125 | 2,250 | 2,375 | 2,500 | 2,625 |
| 1 | 10 to 1 | 3,000 | 3,250 | 3,500 | 3,750 | 4,000 | 4,250 | 4,500 | 4,750 | 5,000 | 5,250 |
| 2 | 10 to 1 | 1,500 | 1,625 | 1,750 | 1,875 | 2,000 | 2,125 | 2,250 | 2,375 | 2,500 | 2,625 |
| 4 | 10 to 1 | 750 | -------- | 875 | -------- | 1,000 | -------- | 1,125 | -------- | 1,250 | -------- |

| Steps Per Revolution Setting | Gear Ratio | Total count on full scale select switches obtained by adding the value of all switches set on On—do not use below a total of 12 | | | | | | | | | |
|---|---|---|---|---|---|---|---|---|---|---|---|
| | | 22 | 23 | 24 | 25 | 26 | 27 | 28 | 29 | 30 | 31 |
| 1 | 20 to 1 | 11,000 | 11,500 | 12,000 | 12,500 | 13,000 | 13,500 | 14,000 | 14,500 | 15,000 | 15,500 |
| 2 | 20 to 1 | 5,500 | 5,750 | 6,000 | 6,250 | 6,500 | 6,750 | 7,000 | 7,250 | 7,500 | 7,750 |
| 4 | 20 to 1 | 2,750 | 2,875 | 3,000 | 3,125 | 3,250 | 3,375 | 3,500 | 3,625 | 3,750 | 3,875 |
| 1 | 10 to 1 | 5,500 | 5,750 | 6,000 | 6,250 | 6,500 | 6,750 | 7,000 | 7,250 | 7,500 | 7,750 |
| 2 | 10 to 1 | 2,750 | 2,875 | 3,000 | 3,125 | 3,250 | 3,375 | 3,500 | 3,625 | 3,750 | 3,875 |
| 4 | 10 to 1 | 1,375 | -------- | 1,500 | -------- | 1,625 | -------- | 1,700 | -------- | 1,875 | -------- |

With the reset contact arm 383 in its up, or "manual," position as shown in FIG. 32, the accumulator arm 334 can be reset by pressing the manual reset switch 386 from its normal position as shown in FIG. 32, against the contact 387, to its resetting position against the contact 388. From the contact 388 a circuit is first completed through the "off normal" contact 365*k* of the step relay 365 to the reset relay 378 until the step relay 365 reaches its home position, in the manner described earlier, and the contact 365*k* opens. (If the step relay 365 is in its home position when the manual reset switch is closed, the above action is avoided, as the contact 365*k* is already open, and the following action takes place immediately.) The normally closed reset relay contact 378*c* then closes, completing a circuit through the "manual" contact 385, the contact arm 383, and the self-interrupt contact 380*a* to the accumulator motor 380. The accumulator motor 380 drives the accumulator arm 334 to its full-scale position, opening the circuit from the "manual" contact 385. The accumulator motor 380 then stops until the manual reset switch 386 (which is a pushbutton type switch) is released to its normal position as shown in FIG. 32, connecting the positive terminal of the direct current supply to the operator's station circuits through the contact 387 and initiating the automatic resetting action described above, through the "automatic" contact 384, which steps the accumulator arm 334 to its home, or "zero" position.

Figure 31:
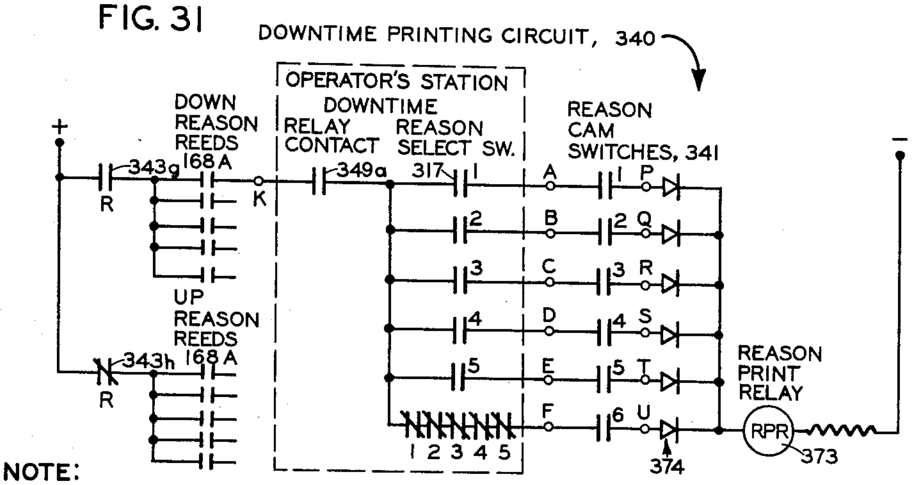
FIG. 31 is a schematic diagram of further typical circuitry associated with that of FIG. 30.

The downtime timing system shown in FIG. 32 is a resistor-capacitor circuit. When the capacitor 359 is charged to approximately 20 volts the four layer diode 362 breaks down (its resistance drops to a very low value) and the downtime relay 349 is pulled in. This causes the recorder to print, in the appropriate place, the reason for downtime, provided the operator has pressed the proper button 317. At the same time, lights are turned on (through the contact 349*d*) behind the particular chart frame associated with the machine having the downtime (an annunciator lamp), and on the accumulator station 301 (the downtime indicator 368), telling the operator to press a button 317 indicating the cause of the downtime. The downtime relay 349 remains energized, through its own contact 349*b* and the contact 358*d* of the count relay 358, until this circuit is broken by having the count relay 358 energized as a result of the closing of the output count switch 355. The recorder then stops printing a downtime record, and the ramp chart record 311 once again starts progressing upward. The next time the recorder starts a traversing cycle from the bottom of the recorder, the timer that initiates the cycle (the scan-starting timer) also energizes the switch reset solenoid 369 in the accumulator station 301, which causes the downtime reason select switches 317 to be reset to their normal positions as shown in FIGS. 31 and 32.

As previously discussed there is a print transfer relay 342 in the system which, while the print-bar 115 is between ramp charts 310, causes the system to cease measuring and print the reason for downtime if such downtime exists. The print transfer relay 342 is controlled by the up and down (or left and right column, L and R) contacts 343*c*, *d*, *e*, *f*, and *g* (FIGS. 30 and 31), and the cam switches 341A and 341B. When the unit is traveling upward the left contact 343*e* is closed, and the cam switch 341A pulls in the print transfer relay 342 through the normally open contact 341*a*. It is held through its own contact 342*a* and the normally closed contact 341*b'* of the switch 341B until its cam actuates the switch 341B, opening the contact 341*b'*. A measuring cycle then begins. The action is reversed when the print-bar 115 is going down. While going down the switch 341*b* closes first, and since the print-bar 115 is going down, the contact 343*f* is closed. This pulls in the print transfer relay 342. It is held in through its own contact 342*d* and the normally closed contact 341*a'* on the cam switch 341A. When the cam switch 341A is struck by the cam, the contact 341*a'* opens, and the print transfer relay 342 is dropped. A measuring cycle again starts.

The print relay 347 causes the system to print points on a ramp chart 310. The print relay 347 is actuated through the normally open measure relay contacts 345, 346. These contacts 345, 346 are open while there is no energy applied to the measure relay 344, but at any time other than during balance the contacts 345, 346 are closed, holding the print relay 347 in and holding open the contact 348. At balance or null, the measure relay contacts 345, 346 open and the print relay 347 is de-energized. The circuit is then completed through the normally closed print relay contact 348, the normally closed print transfer contact 342*c*, the up or down (left or right) contact 343*c* or 343*d* that is closed at the time, depending on the direction of travel, and either the left print solenoid–1 (371) or the right print solenoid–2 (372). The print solenoid 371 prints in the left hand column and the print solenoid 372 prints in the right hand column. The contacts 343*c*, 343*d* determine which print solenoid 371 or 372 is energized by the print relay 347. The reason marks are actuated by a relay 373 called the reason print relay (RPR). The reason print relay 373 is actuated through the downtime relay contact 349*a*, the reason cam switches 341, and the downtime reason select switches 317 in the appropriate machine operator's station 301. The reason print relay 373 thus is pulled in, at the precise time when a downtime printing is to be made, by completing a printing circuit through its normally open contact 373*a* and the print transfer relay contact 342*b*, and (as described above) either through the left column contact 343*c* and the left print solenoid 371 or through the right column contact 343*d* and the right print solenoid 372.

As is shown in FIG. 26, counters 319 may be provided to accumulate the number of machine minutes of downtime, one counter 319 being present for each reason for downtime, including unclassified. The counters 319 accumulate the number of printings made on all charts for each of the six clauses. The same pulses are used (at points P, Q, R, S, T, U, respectively, FIG. 31) to actuate the counters 319 that actuate the reason print relay 373. The diodes 374 are connected between the counter coils and the reason print relay 373. Since a counter coil must be energized only when a downtime print occurs for a particular reason, yet each of these pulses must be transferred to the reason print relay 373, these diodes 374 avoid the backdoor circuit which would cause all of the downtime counters 319 to be actuated by any cause of downtime.

Each ramp chart 310 accumulates in analog fashion all pieces made by its associated machine. In some installations it is necessary to tabulate precisely the number of parts made. For this purpose, piece counters 320 may be provided for each machine. The piece counters 320 are actuated by a contact 358*e* on the count relay 358 in the operator's station 301. The piece counters 320 may be located in the recorder box just below the downtime counters 319, as in FIG. 26.

Even where the scanning cycle for the entire sheet is completed in substantially less than a minute, as in the typical two-column production recording system shown and described herein, it is ordinarily preferred to provide precisely one scanning cycle per minute. Thus, the scan-starting timer is set to start a scanning cycle at intervals of one minute each. This is convenient for providing downtime records in the units of downtime minutes. Other scanning intervals can be used, but they preferably should bear a simple relationship to minutes and hours, such as ½, 1, 2, 5, and 6 minutes (and not 47 seconds, 109 seconds, or similar odd intervals).

SUMMARY

To summarize, a typical recording system according to the present invention may comprise various of the following features and combinations thereof:

(a) A sheet held therein containing indicia thereon defining a plurality of charts;

(b) At least one marking means adjacent to, and in movable relationship with said sheet;

(c) Means synchronized with the relative movement between said marking means and said sheet for measuring successively the values of a plurality of variable quantities;

(d) Means for actuating said marking means to provide graphic records on said sheet of said values as measured at predetermined intervals;

(e) Each said value comprising a measure proportionate to the total number of input pulses fed to said recording system by a particular input device from a preselected starting time to the time of recording said value;

(f) Each said record being made as a graph on one said chart;

(g) Means for adjusting said measuring means to provide a mark at full scale on said chart when the measured total number of input pulses equals a predetermined number;

(h) Means for shifting the remainder of the record for a particular input device, when said predetermined number is reached, to begin again at a lower point on said chart;

(i) Digital display means for indicating a total proportionate to the number of input pulses from at least one said particular input device;

(j) Each said chart having associated therewith and adjacent thereto on said sheet a marked area for receiving a graphic record indicative of at least one condition associated with said input pulses from said particular input device;

(k) Each said marked area containing a plurality of categorized spaces for indicating various respective categories of information concerning said at least one associated condition;

(l) Means, responsive to at least one said condition, for actuating said marking means to provide at least one mark in said marked area;

(m) Means, responsive to the relative position of said marking means and said sheet, for connecting said marking means in circuit with said measuring means, to the exclusion of said condition-responsive means, when said marking means is in a position over one said chart, and for connecting said marking means in circuit with said condition-responsive means, to the exclusion of said measuring means, when said marking means is in a position over one said marked area;

(n) Adjustable means for varying the length of the time interval during which said at least one condition must exist in order to actuate said marking means to provide said at least one mark in said marked area;

(o) Said interval-length-varying means including a capacitor, adjustable means for determining the charging rate of said capacitor, means responsive to a predetermined voltage across said capacitor for completing a portion of a circuit for actuating said marking means, and means for discharging said capacitor in the absence of said at least one condition;

(p) Said capacitor-voltage responsive means including a voltage-breakdown device;

(q) Including means for determining the location within said marked area wherein each said at least one mark is made;

(r) Said location-determining means including for each said space a first switching means actuatable in response to a predetermined condition associated with said particular input device, connected in circuit with a second switching means that is actuated in response to the relative position of said marking means and said sheet;

(s) Each said marked area containing also an unclassified space for indicating at least one such associated condition not identified in one of the other spaces, said location-determining means causing a mark to be made in said unclassified space in the absence of actuation thereof to provide a different location of said at least one mark, and being responsive to selective actuation thereof to cause said at least one mark to be made in at least one particular said categorized space;

(t) Said input pulses comprising a measure of output of a particular apparatus;

(u) Said at least one associated condition including periods of time during which no output is provided by said particular apparatus;

(v) Said categories including possible causes of lack of output;

(w) Said unclassified space indicating periods of lack of output other than those identified in said categorized spaces;

(x) Said location-determining means including for each said categorized space a first switching means actuatable in response to a predetermined condition associated with said particular input device, connected in circuit with a second switching means that is actuated in response to the relative position of said marking means and said sheet; and for said unclassified space a third switching means that is actuated in the absence of actuation of any of said first switching means, connected in circuit with a fourth switching means that is actuated in response to the relative position of said marking means and said sheet;

(y) Means, responsive to predetermined conditions associated with said input pulses from said particular input device, for providing said selective actuation of said location-determining means to cause said at least one mark to be made in at least one particular said categorized space;

(z) Means, responsive to said location-determining means, for indicating total time of said at least one condition in each category as represented by said categorized spaces and of said at least one condition as recorded in said unclassified space;

(aa) Attention attracting means, responsive to at least one condition associated with said input pulses from said particular input device, comprising means for providing a change readily discernible by at least one of the human senses in the region of said chart;

(bb) Said measuring means comprising means responsive to said input pulses for adjusting a first impedance as a function of the total number of said pulses received, means synchronized with the relative movement between said marking means and said sheet for varying a second impedance, and means responsive to said first and second impedances for providing a detectable signal at the instant when said impedances have a predetermined relationship;

(cc) Said signal-providing means comprising a null detector, and said predetermined relationship of said impedances providing a net input of zero to said null detector;

(dd) Said means for actuating said marking means comprising means responsive to said signal for causing one said marking means to provide a mark on the chart over which it is positioned at said instant, said mark providing an indication proportionate to said total number of input pulses at said instant;

(ee) Said first impedance having a movable member thereon, and said adjusting means comprising stepwise adjusting means, actuated by said input pulses, for moving said movable member;

(ff) Means for adjusting said measuring means to provide a mark at full scale on said chart when the measured total number of input pulses equals a predetermined number; including a stepping switch actuated by said input pulses, first switching means, responsive to rotation of said stepping switch, connected in circuit with second switching means for determining the number of input pulses to said stepping switch required to rotate said stepping switch through a revolution thereof, third switching means, responsive to rotation of said stepping switch, connected in circuit with fourth switching means for determining the number of output pulses provided by a revolution of said stepping switch, said fourth switching means connecting said output pulses to said stepwise adjusting means of said first impedance;

(gg) Means for adjusting said measuring means to provide a mark at full scale on said chart when the measured total number of input pulses equals a predetermined number; including a stepping switch actuated by said input pulses, first switching means, responsive to rotation of said stepping switch, connected in circuit with second switching means for determining the number of input pulses to said stepping switch, beginning with said stepping switch at a predetermined position, required to complete a circuit through said first and second switching means to actuate means for connecting a circuit through self-interrupting contacts to further rotate said stepping switch to said predetermined position thereof, third switching means, responsive to rotation of said stepping switch, providing output pulses therefrom at different rates at different connecting points thereto, fourth switching means for selectively connecting to any desired said connecting point said stepwise adjusting means of said first impedance;

(hh) Said first switching means comprising means for alternately reversing the positions of a plurality of first single-pole double-throw switches, each said switch requiring twice as many pulses to reverse as the next, said second switching means comprising a like number of selectively manually positioned second single-pole double-throw switches, each throw contact of each said second switch being connected to one throw contact of one said first switch to form a switching pair, the movable contacts of each said switching pair comprising the terminals thereof, said terminals of said switching pairs being connected in series, whereby the circuit through said series connected switching pairs is completed only when the number of input pulses to said stepping switch is such that in each said switching pair the movable contact of said first switch is then connected to the throw contact of said first switch that is connected to the throw contact of said second switch in said pair to which the movable contact of said second switch has been selectively connected;

(ii) Means for providing electrical pulses to move said stepwise adjusting means from the position thereof that provides a full-scale mark on said chart, when said stepwise adjusting means reaches said position, to the position thereof that provides a mark at zero on said chart;

(jj) One nearly complete revolution of said stepwise adjusting means, from the position thereof providing a mark at "zero" on said chart to the position thereof providing a mark at full scale on said chart, corresponding to said predetermined number of input pulses;

(kk) Means for completing a revolution of said stepwise adjusting means within a predetermined time after it reaches said full-scale position, by moving it therefrom to said zero position;

(ll) Said revolution-completing means including switching means, responsive to the position of said stepwise adjusting means, for providing pulses to move said stepwise adjusting means from said full-scale position until it reaches said zero position;

(mm) Means for manually actuating said stepwise adjusting means to move it to said zero position;

(nn) Means for limiting the rate of input pulses from a particular input device that can be indicated by said recording system;

(oo) Said electrical pulses being provided, through switching means associated with said particular input device, by a capacitor that is discharged whenever said switching means is actuated, and said rate-of-input-pulses-limiting means including means for charging said capacitor and means for determining the charging rate of said capacitor, said pulses being strong enough to actuate said stepwise adjusting means only after said capacitor has been charged to a predetermined voltage.

Various other features of the graphic recorder as illustrated in FIGS. 1–25 and the description relating thereto may, of course, be used in combination with those most important to the production recording system as illustrated primarily in FIGS. 26–32 and the description relating thereto. For example, other quantities, such as pressures, temperatures, voltages, light intensity, etc., may be measured and recorded along with production and downtime, on the same sheet with any convenient arrangement of charts thereon. Where more than two columns of charts are used, the matrix circuitry of FIG. 20 may be employed. The holding and positioning apparatus of FIGS. 4–8, the staggered-contact impedance and voltage divider of FIGS. 10–19, the null-detecting circuitry and other features of FIG. 23, and various features of construction and of electrical circuitry shown in the other figures may be combined with, or substituted for, associated or similar features of FIGS. 26–32.

While the forms of the invention herein disclosed constitute preferred embodiments, it is not intended to describe or mention all of the possible equivalent forms or ramifications of the invention. It will be understood that the words used are terms of description rather than of limitation, and that various changes may be made without departing from the spirit or scope of the invention.

What is claimed is:

1. A recording system comprising:
(a) a sheet held therein containing indicia thereon defining a plurality of charts;
(b) at least one marking means adjacent to, and in movable relationship with, said sheet;
(c) means synchronized with the relative movement between said marking means and said sheet for measuring successively the values of a plurality of variable quantities;
(d) means for actuating said marking means to provide graphic records on said sheet of said values as measured at predetermined intervals;
(e) each said value comprising a measure proportionate to the total number of input pulses fed to said recording system by a particular input device from a preselected starting time to the time of recording said value;
(f) each said record being made as a graph on one said chart;
(g) each said chart having associated therewith and adjacent thereto on said sheet a marked area for receiving a graphic record indicative of at least one condition associated with said input pulses from said particular input device;
(h) each said marked area containing a plurality of categorized spaces for indicating various respective categories of information concerning said at least one associated condition;
(i) means, responsive to at least one said condition, for actuating said marking means to provide at least one mark in said marked area; and
(j) means, responsive to the relative position of said marking means and said sheet, for connecting said marking means in circuit with said measuring means, to the exclusion of said condition-responsive means, when said marking means is in a position over one said chart, and for connecting said marking means in circuit with said condition-responsive means, to the exclusion of said measuring means, when said marking means is in a position over one said marked area.

2. A recording system according to claim 1, including attention attracting means, responsive to at least one condition associated with said input pulses from said particular input device, comprising means for providing a change readily discernible by at least one of the human senses in the region of said chart.

3. A recording system according to claim 1, including adjustable means for varying the length of the time interval during which said at least one condition must exist in order to actuate said marking means to provide said at least one mark in said marked area.

4. A recording system according to claim 3, wherein said interval-length-varying means includes a capacitor, adjustable means for determining the charging rate of said capacitor, means responsive to a predetermined voltage across said capacitor for completing a portion of a circuit for actuating said marking means, and means for discharging said capacitor in the absence of said at least one condition.

5. A recording system according to claim 4, wherein said capacitor-voltage responsive means includes a voltage-breakdown device.

6. A recording system according to claim 1, including means for determining the location within said marked area wherein each said at least one mark is made.

7. A recording system according to claim 6, wherein said location-determining means includes for each said space a first switching means actuatable in response to a predetermined condition associated with said particular input device, connected in circuit with a second switching means that is actuated in response to the relative position of said marking means and said sheet.

8. A recording system according to claim 6, including means, responsive to said location-determining means, for indicating total time of said at least one condition in each category as represented by said categorized spaces and of said at least one condition as recorded in said unclassified space.

9. A recording system according to claim 6, each said marked area containing also an unclassified space for indicating at least one such associated condition not identified in one of the other spaces, said location-determining means causing a mark to be made in said unclassified space in the absence of actuation thereof to provide a different location of said at least one mark, and being responsive to selective actuation thereof to cause said at least one mark to be made in at least one particular said categorized space.

10. A recording system according to claim 9:
(a) said input pulses comprising a measure of output of a particular apparatus;
(b) said at least one associated condition including periods of time during which no output is provided by said particular apparatus;
(c) said categories including possible causes of lack of output;
(d) said unclassified space indicating periods of lack of output other than those identified in said categorized spaces.

11. A recording system according to claim 9, wherein said location-determining means includes for each said categorized space a first switching means actuatable in response to a predetermined condition associated with said particular input device, connected in circuit with a second switching means that is actuated in response to the relative position of said marking means and said sheet; and for said unclassified space a third switching means that is actuated in the absence of actuation of any of said first switching means, connected in circuit with a fourth switching means that is actuated in response to the relative position of said marking means and said sheet.

12. A recording system according to claim 9, including means, responsive to predetermined conditions associated with said input pulses from said particular input device, for providing said selective actuation of said location-determining means to cause said at least one mark to be made in at least one particular said categorized space.

13. A recording system comprising:
(a) a sheet held therein containing indicia thereon defining a plurality of charts;
(b) at least one marking means adjacent to, and in movable relationship with, said sheet;
(c) means synchronized with the relative movement between said marking means and said sheet for measuring successively the values of a plurality of variable quantities;
(d) means for actuating said marking means to provide graphic records on said sheet of said values as measured at predetermined intervals;
(e) each said value comprising a measure proportionate to the total number of input pulses fed to said recording system by a particular input device;
(f) each said record being made as a graph on one said chart;
(g) said measuring means comprising means responsive to said input pulses for adjusting a first impedance as a function of the total number of said pulses received, means synchronized with the relative movement between said marking means and said sheet for varying a second impedance, and means responsive to said first and second impedances for providing a detectable signal at the instant when said impedances have a predetermined relationship.

14. A recording system according to claim 13, said signal-providing means comprising a null detector, and said predetermined relationship of said impedances providing a net input of zero to said null detector.

15. A recording system according to claim 13, said means for actuating said marking means comprising means responsive to said signal for causing one said marking means to provide a mark on the chart over which it is positioned at said instant, said mark providing an indication proportionate to said total number of input pulses at said instant.

16. A recording system according to claim 13, said first impedance having a movable member thereon, and said adjusting means comprising stepwise adjusting means, actuated by said input pulses, for moving said movable member.

17. A recording system according to claim 16, having means for adjusting said measuring means to provide a mark at full scale on said chart when the measured total number of input pulses equals a predetermined number; including a stepping switch actuated by said input pulses, first switching means, responsive to rotation of said stepping switch, connected in circuit with second switching means for determining the number of input pulses to said stepping switch required to rotate said stepping switch through a revolution thereof, third switching means, responsive to rotation of said stepping switch, connected in circuit with fourth switching means for determining the number of output pulses provided by a revolution of said stepping switch, said fourth switching means connecting said output pulses to said stepwise adjusting means of said first impedance.

18. A recording system according to claim 16, including means for providing electrical pulses to move said stepwise adjusting means from the position thereof that provides a full-scale mark on said chart, when said stepwise adjusting means reaches said position, to the position thereof that provides a mark at zero on said chart.

19. A recording system according to claim 16, including means for manually actuating said stepwise adjusting means to move it to said zero position.

20. A recording system according to claim 16, having means for adjusting said measuring means to provide a mark at full scale on said chart when the measured total number of input pulses equals a predetermined number; including a stepping switch actuated by said input pulses, first switching means, responsive to rotation of said stepping switch, connected in circuit with second switching means for determining the number of input pulses to said stepping switch, beginning with said stepping switch at a predetermined position, required to complete a circuit through said first and second switching means to actuate means for connecting a circuit through self-interrupting contacts to further rotate said stepping switch to said predetermined position thereof, third switching means, responsive to rotation of said stepping switch, providing output pulses therefrom at different rates at different connecting points thereto, fourth switching means for selectively connecting to any desired said connecting point said stepwise adjusting means of said first impedance.

21. A recording system according to claim 20, said first switching means comprising means for alternately reversing the positions of a plurality of first single-pole double-throw switches, each said switch requiring twice as many pulses to reverse as the next, said second switching means comprising a like number of selectively manually positioned second single-pole double throw switches, each throw contact of each said second switch being connected to one throw contact of one said first switch to form a switching pair, the movable contacts of each said switching pair comprising the terminals thereof, said terminals of said switching pairs being connected in series, whereby the circuit through said series connected switching pairs is completed only when the number of input pulses to said stepping switch is such that in each said switching pair the movable contact of said first switch is then connected to the throw contact of said first switch that is connected to the throw contact of said second switch in said pair to which the movable contact of said second switch has been selectively connected.

22. A recording system according to claim 16, including means for limiting the rate of input pulses from a particular input device that can be indicated by said recording system.

23. A recording system according to claim 22, wherein said electrical pulses are provided, through switching means associated with said particular input device, by a capacitor that is discharged whenever said switching means is actuated, and wherein said rate-of-input-pulses-limiting means includes means for charging said capacitor and means for determining the charging rate of said capacitor, said pulses being strong enough to actuate said stepwise adjusting means only after said capacitor has been charged to a predetermined voltage.

24. A recording system according to claim 16, one nearly complete revolution of said stepwise adjusting means, from the position thereof providing a mark at "zero" on said chart to the position thereof providing a mark at full scale on said chart, corresponding to said predetermined number of input pulses.

25. A recording system according to claim 24, including means for completing a revolution of said stepwise adjusting means within a predetermined time after it reaches said full-scale position, by moving it therefrom to said zero position.

26. A recording system according to claim 25, wherein said revolution-completing means includes switching means, responsive to the position of said stepwise adjusting means, for providing pulses to move said stepwise adjusting means from said full-scale position until it reaches said zero position.

References Cited by the Examiner

UNITED STATES PATENTS

| | | | |
|---|---|---|---|
| 2,463,708 | 3/49 | McCreary | 340—347 |
| 2,693,593 | 11/54 | Crosman | 340—347 |
| 2,915,356 | 12/59 | Reilly | 346—17 |
| 3,044,069 | 7/62 | Klumb et al. | 346—17 |

FOREIGN PATENTS

| | | |
|---|---|---|
| 235,781 | 6/11 | Germany. |
| 687,653 | 2/53 | Great Britain. |

LEO SMILOW, *Primary Examiner.*

EMIL G. ANDERSON, *Examiner.*